US008847442B2

(12) United States Patent
Taira

(10) Patent No.: US 8,847,442 B2
(45) Date of Patent: Sep. 30, 2014

(54) POWER CONVERTING APPARATUS AND POWER CONVERTING SYSTEM

(75) Inventor: Satoshi Taira, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/641,381

(22) PCT Filed: Feb. 17, 2012

(86) PCT No.: PCT/JP2012/053880
§ 371 (c)(1),
(2), (4) Date: Oct. 15, 2012

(87) PCT Pub. No.: WO2013/121589
PCT Pub. Date: Aug. 22, 2013

(65) Prior Publication Data
US 2013/0214599 A1    Aug. 22, 2013

(51) Int. Cl.
*G06F 1/04* (2006.01)
*H02M 7/537* (2006.01)
(52) U.S. Cl.
CPC ........... *H02M 7/537* (2013.01); *G06F 1/04* (2013.01); *H02N 2001/008* (2013.01)
USPC .......................................... 307/151; 340/13.2
(58) Field of Classification Search
CPC ................................................. G06F 1/04
USPC .......................................... 307/151; 340/13.2
See application file for complete search history.

(56) References Cited

U.S. PATENT DOCUMENTS

| 6,169,341 | B1 * | 1/2001 | Nagai ............................. 307/82 |
| 6,531,970 | B2 * | 3/2003 | McLaughlin et al. .......... 341/61 |
| 7,602,080 | B1 * | 10/2009 | Hadar et al. .................... 307/20 |
| 7,656,690 | B2 * | 2/2010 | Yamada et al. ................. 363/71 |
| 7,889,061 | B2 * | 2/2011 | Endo ......................... 340/12.33 |
| 8,054,031 | B2 * | 11/2011 | Uechi ........................... 318/800 |

(Continued)

FOREIGN PATENT DOCUMENTS

CN    102145661 A    8/2011
JP    06284704 A  * 10/1994 ............. H02M 3/00

(Continued)

OTHER PUBLICATIONS

International Search Report of PCT/JP2012/053880 dated Mar. 19, 2012.

(Continued)

*Primary Examiner* — Adi Amrany
(74) *Attorney, Agent, or Firm* — Sughrue Mion, PLLC

(57) ABSTRACT

A power converting apparatus is connected to a second power converting apparatus via a power supply line and an earth line, and includes: a carrier-signal generating unit configured to switch a frequency to a frequency selected from a plurality of candidate frequencies or a candidate frequency range according to information to be transmitted to the second power converting apparatus and generate a carrier signal having the switched frequency; a PWM-signal generating unit configured to generate a PWM signal using the generated carrier signal; and a switching element for controlling a control target, which makes switching according to the PWM signal to thereby perform an operation for power conversion and transmits a voltage-to-earth signal corresponding to the information to be transmitted, to the second power converting apparatus via the power supply line and the earth line.

11 Claims, 15 Drawing Sheets

(56) References Cited

U.S. PATENT DOCUMENTS

| | | | |
|---|---|---|---|
| 8,217,533 B2 * | 7/2012 | Jones et al. | 307/82 |
| 8,278,865 B2 * | 10/2012 | Shimada et al. | 318/503 |
| 8,581,533 B2 * | 11/2013 | Hayashi et al. | 318/400.23 |
| 2006/0077046 A1 * | 4/2006 | Endo | 340/310.11 |
| 2009/0245806 A1 | 10/2009 | Murayama et al. | |
| 2010/0127571 A1 * | 5/2010 | Hadar et al. | 307/77 |
| 2010/0320014 A1 * | 12/2010 | Woody et al. | 180/65.8 |
| 2011/0080131 A1 | 4/2011 | Shimada et al. | |
| 2011/0172859 A1 * | 7/2011 | Sankaran et al. | 701/22 |
| 2012/0044014 A1 * | 2/2012 | Stratakos et al. | 327/530 |
| 2012/0286716 A1 * | 11/2012 | Ohsugi | 318/494 |
| 2013/0026840 A1 * | 1/2013 | Arditi et al. | 307/77 |
| 2013/0033914 A1 * | 2/2013 | Yahata et al. | 363/132 |
| 2013/0049666 A1 * | 2/2013 | Osugi | 318/503 |

FOREIGN PATENT DOCUMENTS

| | | | | | |
|---|---|---|---|---|---|
| JP | 7-73973 A | 3/1995 | | | |
| JP | 8-102369 A | 4/1996 | | | |
| JP | 2000-13382 A | 1/2000 | | | |
| JP | 2001-36592 A | 2/2001 | | | |
| JP | 2003304679 A | * | 10/2003 | | H02M 3/00 |
| JP | 2003304690 A | * | 10/2003 | | H02M 7/08 |
| JP | 2008-66828 A | 3/2008 | | | |
| JP | 2009-117892 A | 5/2009 | | | |
| JP | 2009-260953 A | 11/2009 | | | |
| JP | 2011-192481 A | 9/2011 | | | |

OTHER PUBLICATIONS

Chinese Office Action issued Apr. 21, 2014 in corresponding Chinese Application No. 201280001179.1.

* cited by examiner

POWER CONVERTING APPARATUS AND POWER CONVERTING SYSTEM

CROSS REFERENCE TO RELATED APPLICATIONS

This application is a National Stage of International Application No. PCT/JP2012/053880 filed Feb. 17, 2012, the contents of all of which are incorporated herein by reference in their entirety.

FIELD

The present invention relates to a power converting apparatus and a power converting system.

BACKGROUND

In the past, a system including a plurality of semiconductor power converting apparatuses have sometimes performed information communication among the semiconductor power converting apparatuses for the purpose of controlling the semiconductor power converting apparatuses to cooperate with one another or the other purpose like that. In performing the information communication among the semiconductor power converting apparatuses, the communication is generally performed using a dedicated communication line. However, laying man-hour for laying the dedicated communication line is substantially required. In some case, a noise current may flow via the communication line and a trouble due to noise may occur.

To solve the problem, Patent Literature 1 descries that, in a power-line carrier communication system in which a plurality of lighting apparatuses are connected to a power line, a master lighting apparatus transmits a signal to slave lighting apparatuses in a common mode communication and performs control to associate lighting states of the slave lighting apparatuses with a lighting state of the master lighting apparatus. Specifically, in the master lighting apparatus, a control unit controls a field effect transistor to be turned on and off according to a signal for controlling the lighting states of the slave lighting apparatuses and transmits a signal, which is formed according to the magnitude of the amplitude of a waveform flowing to a ground side, to the slave lighting apparatuses in the common mode communication. In the slave lighting apparatus, detection circuit extracts a signal component through a ground capacitor to form a signal of a rectangular waveform and inputs the signal to a control section, thereby receiving the signal transmitted in the common mode communication. Consequently, according to Patent Literature 1, because the signals can be transmitted and received in the common mode communication, it is, supposedly, possible to perform the power-line carrier communication without cutting off power feeding of the power line.

CITATION LIST

Patent Literature

Patent Literature 1: Japanese Patent Application Laid-open No. 2008-066828

SUMMARY

Technical Problem

In the system described in Patent Literature 1, the signal formed according to the magnitude of the amplitude of the waveform (voltage-to-earth signal) flowing to the ground side is transmitted and received in the common mode communication. For this reason, the master lighting apparatus requires a switching element and a peripheral circuit that are exclusive for communication for changing the impedance of the power line with respect to the earth. Consequently, it is likely that manufacturing costs for the master lighting apparatus (a lighting apparatus on a transmission side) increase.

The system described in Patent Literature 1 is a system for detecting the magnitude of the amplitude of the voltage of the power line with respect to the earth. Therefore, bidirectional communication and communication among three or more apparatuses on one and the same power line are difficult. In addition, because the amplitude changes according to the impedance of the power line, there is a concern that separate adjustment of a signal level is necessary or reliability of communication may be deteriorated depending on a system.

The present invention has been devised in view of the above-mentioned circumstances, and it is an object of the present invention to obtain a power converting apparatus and a power converting system, which can communicate a voltage-to-earth signal according to information and reduce manufacturing cost on a transmission side.

Solution to Problem

In order to solve the above problems and achieve the object, the present invention provides a power converting apparatus connected to a second power converting apparatus via a power supply line and an earth line, the power converting apparatus comprising: a carrier-signal generating unit configured to switch a frequency to a frequency selected from a plurality of candidate frequencies or a candidate frequency range according to information to be transmitted to the second power converting apparatus and generate a carrier signal having the switched frequency; a PWM-signal generating unit configured to generate a PWM signal using the generated carrier signal; and a switching element for controlling a control target, the switching element making switching according to the generated PWM signal to thereby perform an operation for power conversion and transmitting a voltage-to-earth signal corresponding to the information to be transmitted, to the second power converting apparatus via the power supply line and the earth line.

Advantageous Effects of Invention

According to the present invention, a switching operation of the switching element serves as both an operation for power conversion and an operation for transmitting a voltage-to-earth signal. Consequently, it is possible to transmit a voltage-to-earth signal according to information to be transmitted, from a power converting apparatus on a transmission side to a power converting apparatus on a reception side without adding a large circuit configuration exclusive for communication in the power converting apparatus on the transmission side. In other words, it is possible to communicate a voltage-to-earth signal according to the information and reduce manufacturing costs on the transmission side.

DESCRIPTION OF EMBODIMENTS

Embodiments of a power converting system according to the present invention are described in detail below with reference to the drawings. The present invention is not limited by the embodiments.

First Embodiment

Figure 1:
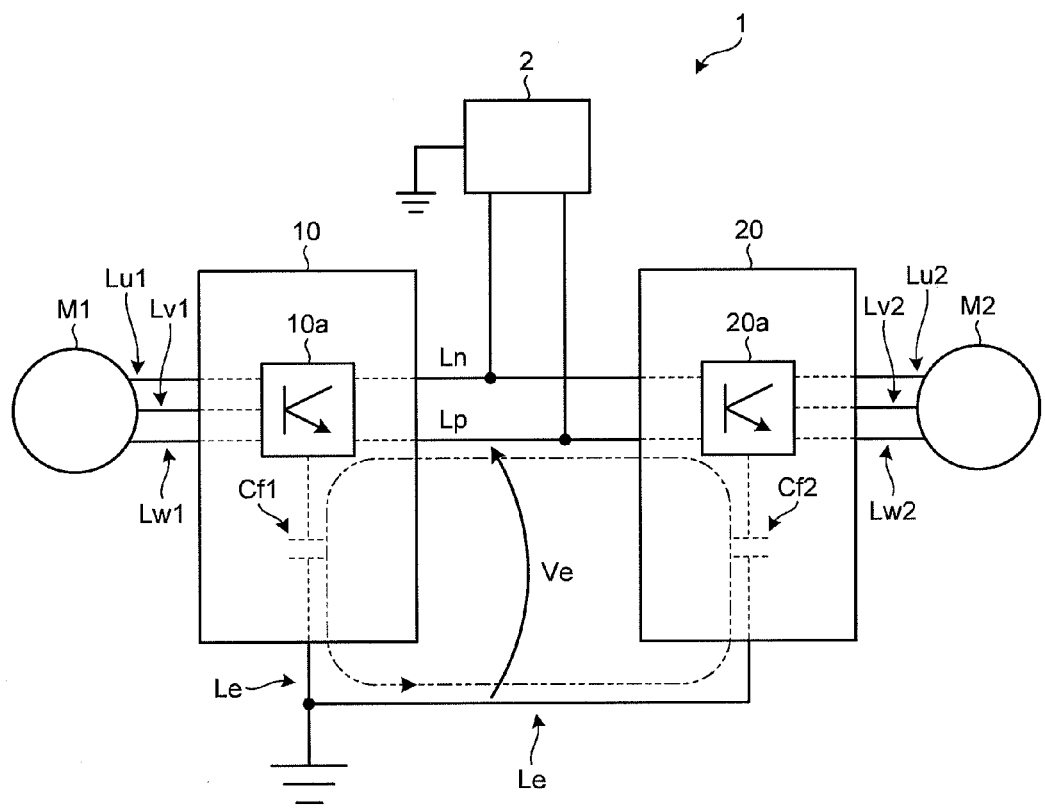
FIG. 1 is a diagram showing a configuration of a power converting system according to a first embodiment.

A power converting system 1 according to a first embodiment is explained with reference to FIG. 1. FIG. 1 is a diagram showing a configuration of the power converting system 1.

The power converting system 1 performs a predetermined power converting operation and controls a plurality of control targets M1 and M2. The control targets M1 and M2 are, for example, motors or machines. Specifically, the power converting system 1 includes a power supply apparatus 2, a power converting apparatus 10, and a power converting apparatus 20.

The power supply apparatus 2 is connected to the power converting apparatus 10 and the power converting apparatus 20 via a power supply line Lp and a power supply line Ln. The power converting apparatus 10 and the power converting apparatus 20 are connected to the power supply apparatus 2 in parallel.

The power supply apparatus 2 generates direct-current electric power and supplies the generated direct-current electric power to each of the power converting apparatus 10 and the power converting apparatus 20 via the power supply line Lp and the power supply line Ln.

The power converting apparatus 10 is connected to the power supply apparatus 2 and the power converting apparatus 20 via the power supply line Lp and the power supply line Ln. The power converting apparatus 10 is connected to a ground potential via an earth line Le. The power converting apparatus 10 is connected to the control target M1 via power lines Lu1, Lv1 and Lw1.

Figure 4:
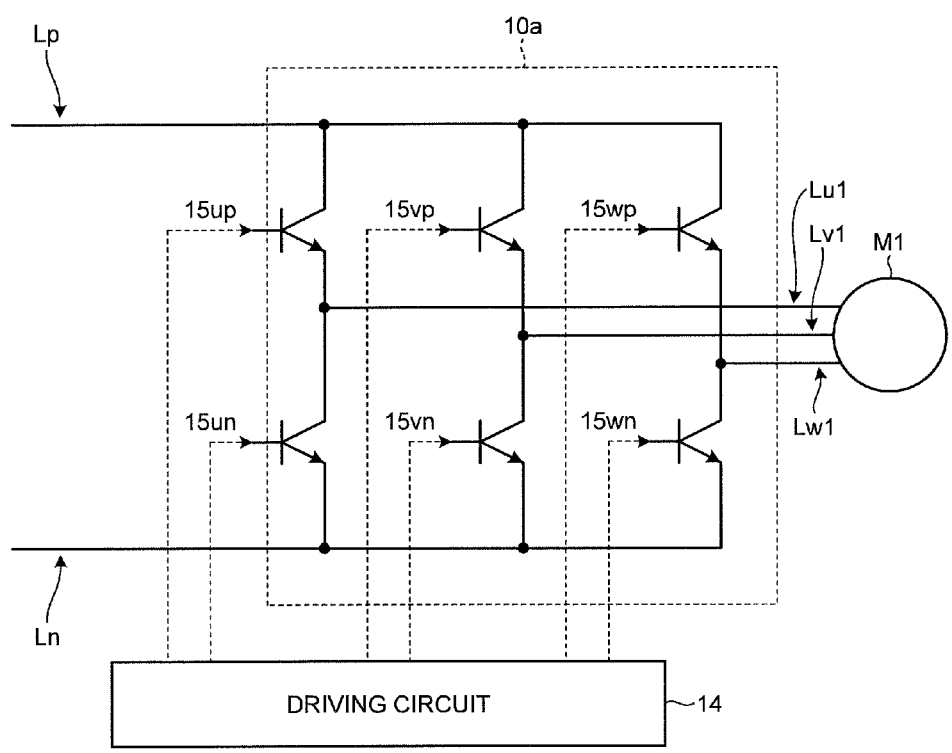
FIG. 4 is a diagram showing a configuration of a switching element in the first embodiment.

The power converting apparatus 10 receives the direct-current electric power from the power supply apparatus 2 via the power supply line Lp and the power supply line Ln. The power converting apparatus 10 performs a power converting operation for converting the direct-current electric power into alternating-current electric power in a main circuit 10a. Specifically, a plurality of switching elements 15-$up$ to 15-$wn$ (see FIG. 4) in the main circuit 10a are respectively turned on and off in predetermined timings. The power converting apparatus 10 supplies the converted alternating-current electric power to the control target M1 via the power lines Lu1, Lv1 and Lw1. Consequently, the power converting apparatus 10 controls to drive the control target M1.

The power converting apparatus 20 is connected to the power supply apparatus 2 and the power converting apparatus 10 via the power supply line Lp and the power supply line Ln. The power converting apparatus 10 is connected to the ground potential via the earth line Le. The power converting apparatus 20 is connected to the control target M2 via power lines Lu2, Lv2 and Lw2.

The power converting apparatus 20 receives the direct-current electric power from the power supply apparatus 2 via the power supply line Lp and the power supply line Ln. The power converting apparatus 20 performs a power converting operation for converting the direct-current electric power into alternating-current electric power in a main circuit 20a. Specifically, a plurality of switching elements (see FIG. 4) in the main circuit 20a are respectively turned on and off in predetermined timings. The power converting apparatus 20 supplies the converted alternating-current electric power to the control target M2. Consequently, the power converting apparatus 20 controls to drive the control target M2.

In the power converting apparatus 10, the main circuit 10a and the earth line Le are equivalently connected via a stray capacitance Cf1. Similarly, in the power converting apparatus 20, the main circuit 20a and the earth line Le are equivalently connected via a stray capacitance Cf2. Consequently, when the switching elements 15 (see FIG. 2) in the main circuit 10a are turned on and off, as indicated by a chained line in FIG. 1, a voltage-to-earth signal Ve (see FIG. 3(c)) is transferred to the power converting apparatus 20 via, for example, the power supply line Lp and the earth line Le. Therefore, in this embodiment, making use of the transfer, the voltage-to-earth signal Ve (see FIG. 3(c)) corresponding to predetermined information is transmitted from the power converting apparatus 10 to the power converting apparatus 20. In other words, in this embodiment, the power converting apparatus 10 functions as a power converting apparatus on a transmission side, and the power converting apparatus 20 functions as a power converting apparatus on a reception side.

Figure 2:
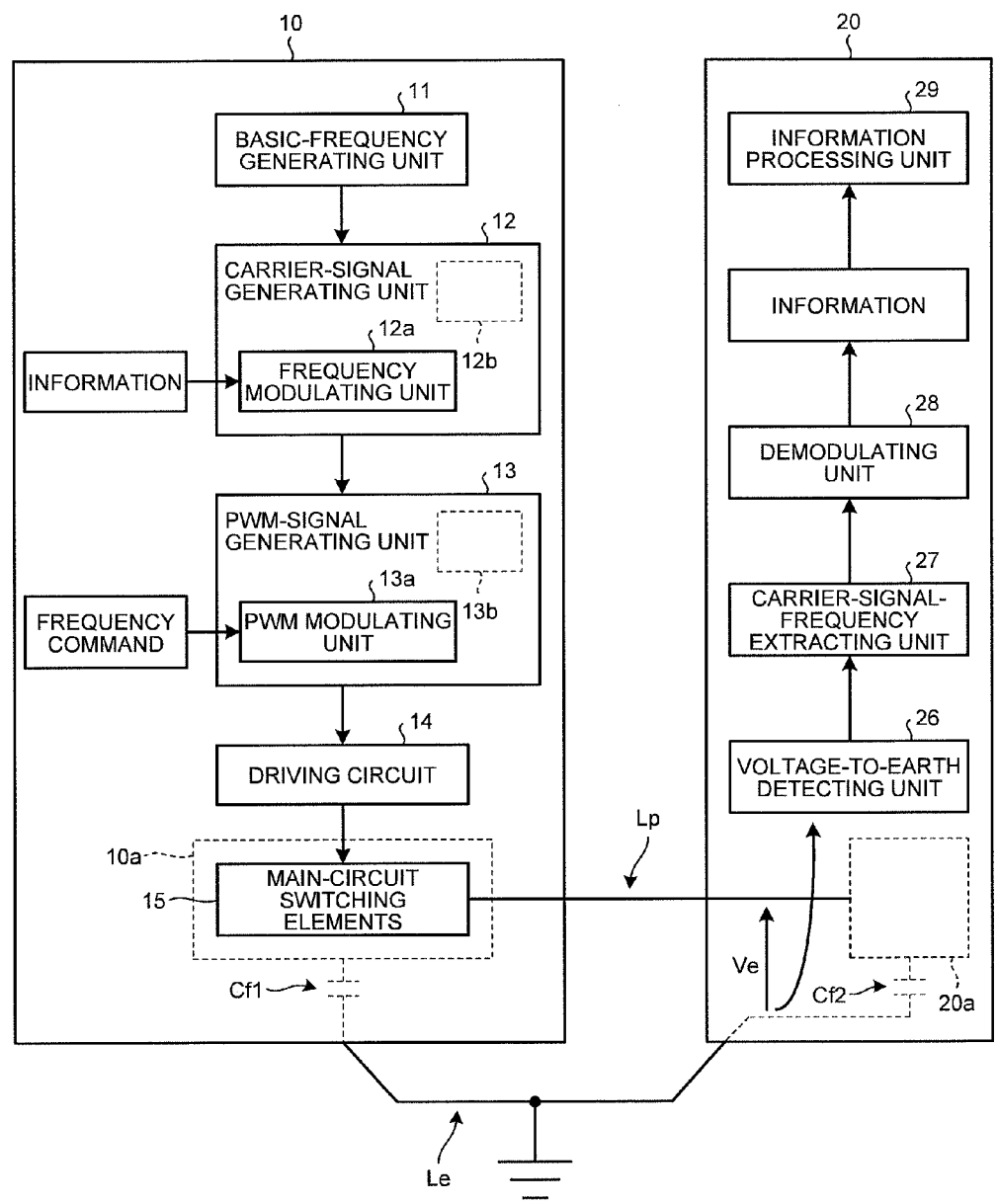
FIG. 2 is a diagram showing the configuration of the power converting system according to the first embodiment.
Figure 3:
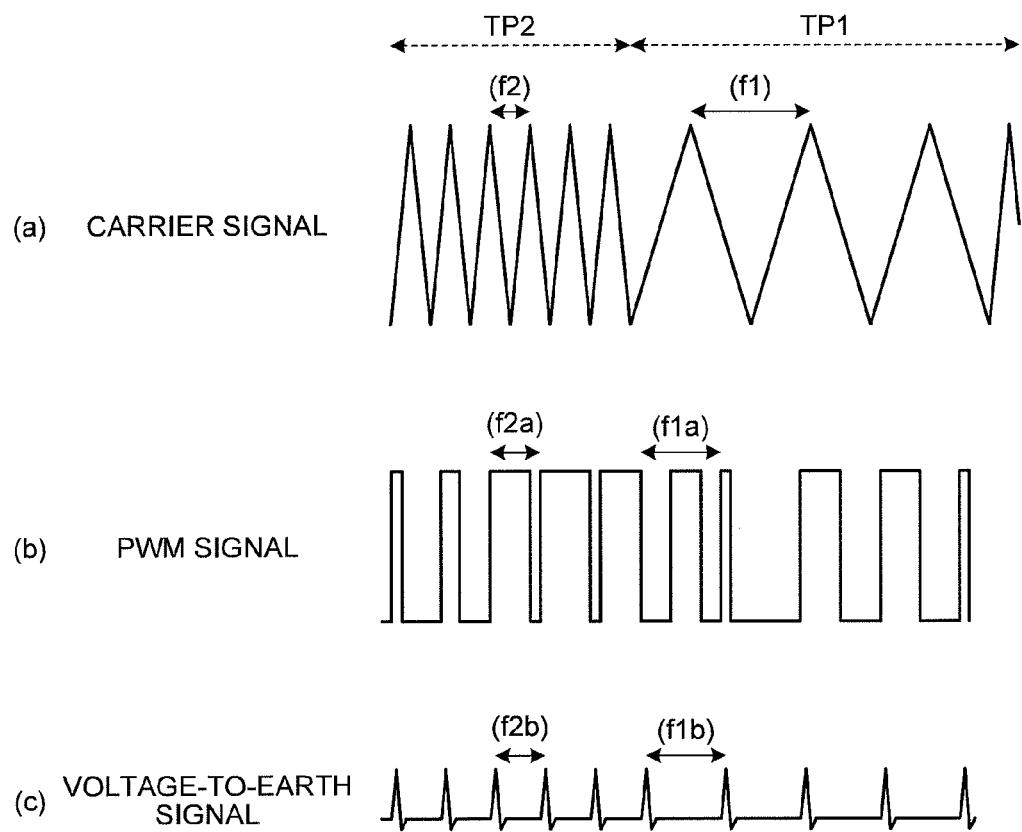
FIG. 3 is an illustration showing an operation of the power converting system according to the first embodiment.

A configuration related to communication in the power converting apparatus 10 is explained with reference to FIG. 2. FIG. 2 is a diagram showing the configuration related to communication in the power converting apparatus 10.

The power converting apparatus 10 includes, as shown in FIG. 2, a basic-frequency generating unit 11, a PWM-carrier-signal generating unit 12, a PWM-signal generating unit 13, a driving circuit 14, and switching elements 15 of the main circuit 10a. A plurality of switching elements 15-up to 15-wn in the main circuit 10a perform equivalent operations concerning the transmission of the voltage-to-earth signal Ve. Therefore, in FIG. 2, the switching elements 15-up to 15-wn are shown as the switching elements 15.

The basic-frequency generating unit 11 generates a reference signal having a basic frequency. As the basic-frequency generating unit 11, for example, an oscillator or a quartz oscillator is used. The basic-frequency generating unit 11 supplies the generated reference signal to the PWM-carrier-signal generating unit 12.

The PWM-carrier-signal generating unit 12 receives the reference signal from the basic-frequency generating unit 11. The PWM-carrier-signal generating unit 12 generates a carrier signal using the reference signal. At this point, the PWM-carrier-signal generating unit 12 modulates the frequency of the carrier signal according to information (i.e., a bit pattern) to be transmitted to the power converting apparatus 20. Accordingly, the PWM-carrier-signal generating unit 12 includes a frequency modulating unit 12a and a generating unit 12b.

The frequency modulating unit 12a receives the information to be transmitted to the power converting apparatus 20, from the outside (e.g., a not-shown upper level controller). A plurality of candidate frequencies are set in advance in the frequency modulating unit 12a. The number of candidate frequencies set in advance corresponds to the number of bit values, which the voltage-to-earth signal Ve to be transmitted can take. In the frequency modulating unit 12a, a candidate frequency range having a certain degree of continuity can be set in advance instead of the discrete candidate frequencies.

Figure 7:
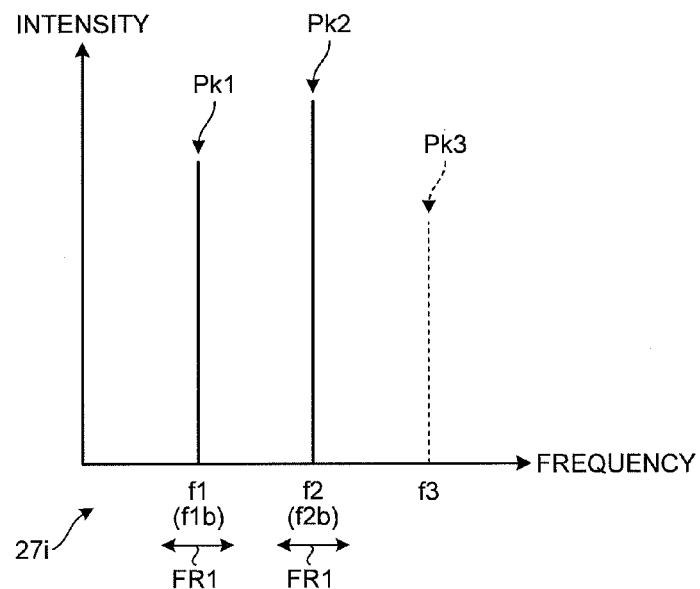
FIG. 7 is a graph showing an operation of the carrier-signal-frequency extracting unit in the modification of the first embodiment.

For example, when a binary voltage-to-earth signal Ve is transmitted from the power converting apparatus 10 to the power converting apparatus 20, a candidate frequency f1 corresponding to a bit value "0" and a candidate frequency f2 corresponding to a bit value "1" (see FIG. 3(a)) are set in the frequency modulating unit 12a. In other words, in the frequency modulating unit 12a, correlation information between the possible bit values and the candidate frequencies is set in advance for the candidate frequencies. Both the candidate frequencies f1 and f2 are set to values different from a frequency f3 of a carrier signal used in the power converting apparatus 20 on the reception side (see FIG. 7).

The frequency modulating unit 12a selects, for example, one frequency from the candidate frequencies f1 and f2 (or the candidate frequency range) according to the information to be transmitted to the power converting apparatus 20 and switches a frequency to be requested to the generating unit 12b, to the selected frequency. Specifically, the frequency modulating unit 12a may digitally select the frequency to be requested to the generating unit 12b and accordingly switch the frequency or may analogically select it and accordingly switch the frequency. The frequency modulating unit 12a requests the generating unit 12b to generate a carrier signal at the switched frequency. The generating unit 12b receives the request and generates, using a reference signal as a reference (e.g., clock), a carrier signal having the switched frequency.

For example, as shown in FIG. 3(a), in a period TP2, a carrier signal is generated at the frequency f2 corresponding to the bit value "1". In a period TP1, a carrier signal is generated at the frequency f1 corresponding to the bit value "0". In other words, the information to be transmitted to the power converting apparatus 20 is embedded in the carrier signal in a form of a frequency.

The PWM-carrier-signal generating unit 12 supplies the generated carrier signal to the PWM-signal generating unit 13.

The PWM-signal generating unit 13 receives the carrier signal from the PWM-carrier-signal generating unit 12. The PWM-signal generating unit 13 generates a PWM signal using the carrier signal. At this point, the PWM-signal generating unit 13 modulates the pulse width (duty ratio) of the PWM signal according to a frequency command. The PWM-signal generating unit 13 includes a PWM modulating unit 13a and a generating unit 13b.

The PWM modulating unit 13a receives the frequency command from the outside (e.g., the not-shown upper level controller). The PWM modulating unit 13a generates a threshold according to the frequency command and supplies the threshold to the generating unit 13b. The generating unit 13b receives the carrier signal from the PWM-carrier-signal generating unit 12 and receives the threshold from the PWM modulating unit 13a. The generating unit 13b compares the carrier signal with the threshold and generates a PWM signal according to a comparison result. At this point, the frequency of the generated PWM signal corresponds to the frequency of the carrier signal.

For example, as shown in FIG. 3(b), in the period TP2, while generating a PWM signal at a frequency f2a corresponding to the bit value "1", the generating unit 13b changes the pulse width (duty ratio) of the PWM signal to a pulse width according to the frequency command. In the period TP1, while generating a PWM signal at a frequency f1a corresponding to the bit value "0", the generating unit 13b changes the pulse width (the duty ratio) of the PWM signal to a pulse width according to the frequency command. In other words, the information to be transmitted to the power converting apparatus 20 is embedded in the PWM signal in a form of a frequency, and at the same time a parameter according to the frequency command is embedded in the PWM signal in a form of a pulse width (duty ratio).

The PWM-signal generating unit 13 supplies the generated PWM signal to the driving circuit 14.

The driving circuit 14 receives the PWM signal from the PWM-signal generating unit 13. The driving circuit 14 generates, according to the PWM signal, driving signals for the respective switching elements 15-up to 15-wn (see FIG. 4) in the main circuit 10a, i.e., the switching elements 15 of the main circuit 10a. At this point, the information to be transmitted to the power converting apparatus 20 is embedded also in the driving signals in a form of a frequency, and at the same time the parameter according to the frequency command is embedded in the driving signals in a form of pulse width (duty ratio).

The switching elements 15 of the main circuit 10a receive the driving signals from the driving circuit 14. The switching elements 15 of the main circuit 10a are turned on and off at predetermined timings according to the driving signals. Consequently, the power converting apparatus 10 converts direct-current electric power into alternating-current electric power, and supplies the converted alternating-current electric power to the control target M1 via the power lines Lu1, Lv1 and Lw1 to control and drive the control target M1. The switching elements 15 of the main circuit 10a are switching elements for controlling the control target M1.

The switching elements 15 of the main circuit 10a perform switching according to the PWM signal generated by the PWM-signal generating unit 13. The switching elements 15 of the main circuit 10a perform an operation for power conversion and transmit the voltage-to-earth signal Ve corresponding to the information to be transmitted, to the power converting apparatus 20 via, for example, the power supply line Lp and the earth line Le. In other words, switching operations (ON/OFF operations) of the switching elements 15 of the main circuit 10a serve as both an operation for power conversion and an operation for embedding the information and transmitting the voltage-to-earth signal Ve.

For example, as shown in FIG. 3(c), in the period TP2, the voltage-to-earth signal Ve is transmitted at a frequency f2b corresponding to the bit value "1". In the period TP1, the voltage-to-earth signal Ve is transmitted at a frequency f1b corresponding to the bit value "0". In other words, the information to be transmitted to the power converting apparatus 20 is embedded in the voltage-to-earth signal Ve in a form of a frequency.

A configuration related to communication in the power converting apparatus 20 is explained with reference to FIG. 2. FIG. 2 is a diagram showing the configuration related to communication in the power converting apparatus 20.

The power converting apparatus 20 includes, as shown in FIG. 2, a voltage-to-earth detecting unit 26, a carrier-signal-frequency extracting unit 27, a demodulating unit (restoring unit) 28, and an information processing unit 29.

The voltage-to-earth detecting unit 26 detects the voltage-to-earth signal Ve via the power supply line Lp and the earth line Le. For example, the voltage-to-earth detecting unit 26 may acquire a potential on the power supply line Lp and a potential on the earth line Le, and calculate a difference between the potentials using, for example, a differential amplifier to thereby detect the voltage-to-earth signal Ve. Alternatively, for example, the voltage-to-earth detecting unit 26 may acquire a potential on a node connected to an electrode of the stray capacitance Cf2 on the main circuit 20a side and a potential on a node connected to an electrode of the stray capacitor Cf2 on the opposite side of the main circuit 20a, and calculate a difference between the potentials using, for example, a differential amplifier to thereby detect the voltage-to-earth signal Ve. The voltage-to-earth detecting unit 26 supplies the detected voltage-to-earth signal Ve to the carrier-signal-frequency extracting unit 27.

The carrier-signal-frequency extracting unit 27 receives the voltage-to-earth signal Ve from the voltage-to-earth detecting unit 26. The carrier-signal-frequency extracting unit 27 extracts, from the voltage-to-earth signal Ve, a frequency component corresponding to any one frequency of a plurality of candidate frequencies (e.g., f1 and f2) (or a candidate frequency range FR1) of a carrier signal.

Figure 5:
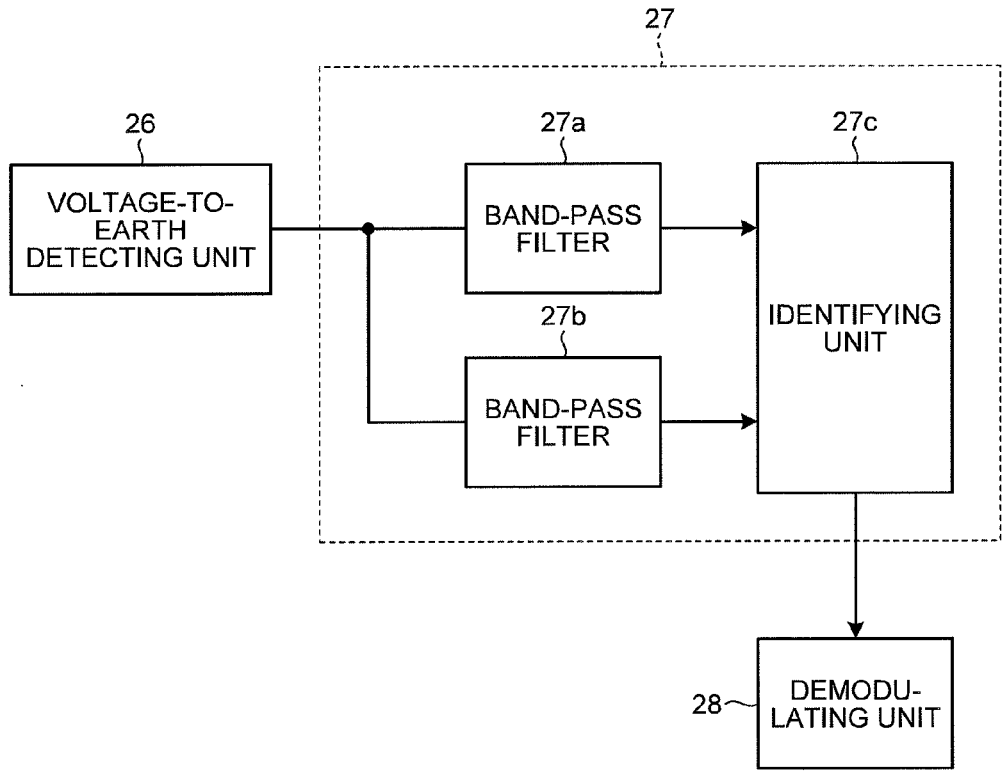
FIG. 5 is a diagram showing a configuration of a carrier-signal-frequency extracting unit in the first embodiment.

For example, the carrier-signal-frequency extracting unit 27 includes, as shown in FIG. 5, a plurality of band-pass filters 27a and 27b and an identifying unit 27c.

The band-pass filters 27a and 27b have pass bands corresponding to the candidate frequencies of the carrier signal. In other words, the band-pass filters 27a and 27b are provided to correspond to the number of bit values that the voltage-to-earth signal Ve can take.

For example, the band-pass filter 27a has a pass band corresponding to the candidate frequency f1. In other words, the band-pass filter 27a has a pass band corresponding to the bit value "0". In the case shown in FIG. 3, (a) to (c), the band-pass filter 27a has a pass band for selectively allowing a frequency near the frequency f1b corresponding to the candidate frequency f1, i.e., the bit value "0" to pass therethrough.

For example, the band-pass filter 27b has a pass band corresponding to the candidate frequency f2. In other words, the band-pass filter 27b has a pass band corresponding to the bit value "1". In the case shown in FIG. 3, (a) to (c), the band-pass filter 27b has a pass band for selectively allowing a frequency near the frequency f2b corresponding to the candidate frequency f2, i.e., the bit value "1" to pass therethrough.

When the identifying unit 27c receives a signal from one of the band-pass filters 27a and 27b, the identifying unit 27c identifies a frequency component corresponding to which of the candidate frequencies (or the candidate frequency range) the received signal is.

For example, when the identifying unit 27c receives a frequency component of the frequency f1b from the band-pass filter 27a, the identifying unit 27c identifies the fact that the frequency component is a frequency component corresponding to the candidate frequency f1, i.e., the bit value "0".

For example, when the identifying unit 27c receives a frequency component of the frequency f2b from the band-pass filter 27b, the identifying unit 27c identifies the fact that the frequency component is a frequency component corresponding to the candidate frequency f2, i.e., the bit value "1".

The carrier-signal-frequency extracting unit 27 extracts a frequency component corresponding to any one frequency of the candidate frequencies f1 and f2 by causing the voltage-to-earth signal Ve to pass through the band-pass filters 27a and 27b. The carrier-signal-frequency extracting unit 27 supplies the extracted frequency component to the demodulating unit 28.

The demodulating unit 28 receives a result of the identification of the extracted frequency component and/or the candidate frequency corresponding to the frequency component from the carrier-signal-frequency extracting unit 27. The demodulating unit (restoring unit) 28 restores, according to the result of the identification of the extracted frequency and/or the candidate frequency corresponding to the frequency component, the information transmitted from the power converting apparatus 10. In the demodulating unit 28, a plurality of candidate frequencies (or a candidate frequency range) corresponding to those set in the frequency modulating unit 12a are set in advance. For the candidate frequencies, as with those set in the frequency modulating unit 12a, the number (or a range length) of the frequencies corresponding to the number of bit values that the voltage-to-earth signal Ve to be transmitted can take is set in advance.

When the binary voltage-to-earth signal Ve is transmitted from the power converting apparatus 10 to the power converting apparatus 20, the candidate frequency f1 corresponding to the bit value "0" and the candidate frequency f2 corresponding to the bit value "1" (see FIG. 3(a)) are set in the demodulating unit 28. In other words, in the demodulating unit 28, correlation information between the possible bit values and the candidate frequencies corresponding to that set in the frequency modulating unit 12a is set in advance for the candidate frequencies. When the correlation information set in the frequency modulating unit 12a is updated, the correlation information set in the demodulating unit 28 is preferably updated in synchronization therewith.

For example, as shown in FIG. 3(c), in the period TP2, when recognizing that the voltage-to-earth signal Ve having the frequency f2b corresponding to the candidate frequency f2 is being received, the demodulating unit 28 converts the frequency f2 into the bit value "1" corresponding thereto. In the period TP1, when recognizing that the voltage-to-earth signal Ve having the frequency f1b corresponding to the candidate frequency f1 is being received, the demodulating unit 28 converts the frequency f1 into the bit value "0" corresponding thereto. In other words, the demodulating unit 28 restores the information (i.e., the bit pattern) embedded in the voltage-to-earth signal Ve. The demodulating unit 28 supplies the restored information to the information processing unit 29.

The information processing unit 29 receives the restored information from the demodulating unit 28. The information processing unit 29 performs predetermined information processing using the received information. For example, the information processing unit 29 performs, using the received information, information processing for controlling the power converting apparatus 20 in association with the power converting apparatus 10.

Figure 17:
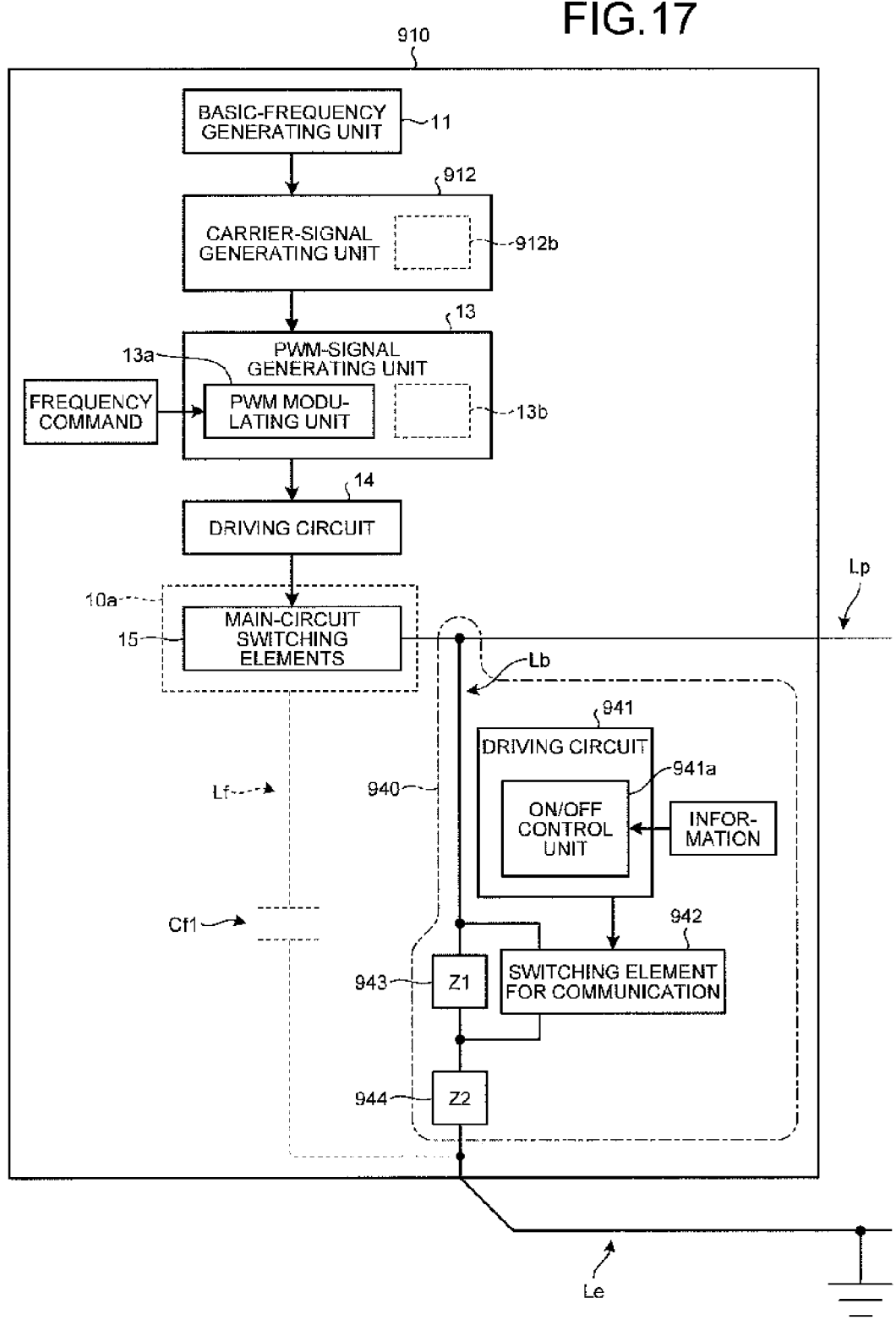
FIG. 17 is a diagram showing a comparative example.
Figure 18:
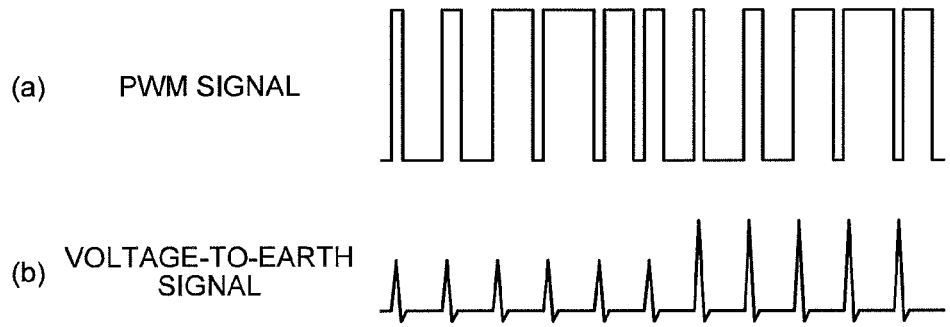
FIG. 18 is an illustration showing a comparative example.

It is assumed that, as shown in FIG. 17, in a power converting apparatus 910 on a transmission side, a carrier-signal generating unit 912 does not include the frequency modulating unit 12a (see FIG. 2). In this case, as shown in FIG. 18, (a) and (b), the power converting apparatus 910 on the transmission side modulates the magnitude of the amplitude of a voltage-to-earth signal according to information to be transmitted. In other words, it is necessary to change the impedance of the power supply line Lp with respect to the earth line Le according to the information to be transmitted. To this end, as shown in FIG. 17, there is provided a bypass line Lb that connects the power supply line Lp and the earth line Le with bypassing a line Lf that equivalently connects the main circuit 10a and the earth line Le via the stray capacitance Cf1, in which a configuration having an impedance element 943 and a switching element 942 connected in parallel is inserted, and in which an impedance element 944 is inserted in series with the configuration. Further, a driving circuit 941 for controlling the switching element 942 to be turned on and off is added thereto. An ON/OFF control unit 941a for controlling the switching element 942 to be turned on and off according to information to be transmitted is provided in the driving circuit 941.

Thus, it is necessary to add a large circuit configuration 940 exclusive for communication in the power converting apparatus 910 on the transmission side. Consequently, there is a tendency for the power converting apparatus 910 on the transmission side to increase in size and for manufacturing costs for the power converting apparatus 910 on the transmission side to increase.

When the impedance element 943 and the impedance element 944 are capacitance elements, it is necessary to increase an electrode area to secure capacitance. Consequently, the power converting apparatus 910 on the transmission side tends to be further increased in size and the manufacturing costs for the power converting apparatus 910 on the transmission side tend to further increase.

On the other hand, in the first embodiment, in the power converting apparatus 10 on the transmission side, the carrier-signal generating unit 12 includes the frequency modulating unit 12a. In this case, the carrier-signal generating unit 12 switches a frequency to a frequency selected from the candidate frequencies f1 and f2 (or the candidate frequency range FR1) according to the information to be transmitted to the power converting apparatus 20 and generates a carrier signal having the switched frequency. The PWM-signal generating unit 13 generates a PWM signal using the generated carrier signal. The switching elements 15 of the main circuit 10a perform switching according to the generated PWM signal to thereby perform an operation for power conversion, and transmit the voltage-to-earth signal Ve corresponding to the information to be transmitted to the power converting apparatus 20 via the power supply line Lp and the earth line Le. In this way, switching operations (ON/OFF operations) of the switching elements 15 of the main circuit 10a also serve as both the operation for power conversion and an operation for embedding the information in the voltage-to-earth signal Ve and transmitting the voltage-to-earth signal Ve. Consequently, it is possible to transmit a voltage-to-earth signal according to the information to be transmitted from the power converting apparatus 10 to the power converting apparatus 20 without adding the large circuit configuration 940 (see FIG. 17) exclusive for communication in the power converting apparatus 10 on the transmission side. In other words, it is possible to communicate the voltage-to-earth signal according to the information and reduce manufacturing costs on the transmission side.

In the first embodiment, in the power converting apparatus 20 on the reception side, the voltage-to-earth detecting unit 26 detects the voltage-to-earth signal Ve via the power supply line Lp and the earth line Le. The carrier-signal-frequency extracting unit 27 extracts, from the voltage-to-earth signal Ve detected by the voltage-to-earth detecting unit 26, a frequency component corresponding to any one frequency of the candidate frequencies f1 and f2 (or the candidate frequency range FR1) of the carrier signal. The demodulating unit 28 restores, according to the frequency component extracted by the carrier-signal-frequency extracting unit 27, the information transmitted from the power converting apparatus 10. Consequently, it is possible to extract the information embedded in the voltage-to-earth signal Ve and receive the voltage-to-earth signal Ve according to the information transmitted from the power converting apparatus 10 on the transmission side as described above. In other words, it is possible to communicate the voltage-to-earth signal according to the information.

In the first embodiment, the carrier-signal-frequency extracting unit 27 includes the band-pass filters 27a and 27b corresponding to the candidate frequencies f1 and f2 (or the candidate frequency range FR1). The carrier-signal-frequency extracting unit 27 extracts a frequency component corresponding to any one frequency of the candidate frequencies f1 and f2 (or the candidate frequency range FR1) by causing the voltage-to-earth signal Ve detected by the voltage-to-earth detecting unit 26 to pass the band-pass filters 27a and 27b. Consequently, it is possible to extract, from the voltage-to-earth signal Ve, a frequency component corresponding to any one frequency of the candidate frequencies f1 and f2 (or the candidate frequency range FR1) of the carrier signal.

In the first embodiment, the power converting system 1 performs communication using the power supply line Lp and the earth line Le that have been already wired. Therefore, wiring work exclusive for communication is unnecessary. Because any communication lines are not required, there is no concern about a trouble due to noises invading through the communication line, for example, when wiring is performed with long cables.

Alternatively, the power converting apparatus 910 on the transmission side shown in FIG. 17 changes the impedance of the power supply line Lp with respect to the earth line Le according to the information to be transmitted and modulates the magnitude of the amplitude of the voltage-to-earth signal according to the information to be transmitted. Therefore, because the amplitude may change depending upon the impedance of the power supply line, it is necessary to individually adjust a signal level depending on a system, and there is a concern that reliability of communication is deteriorated.

On the other hand, in the first embodiment, the information is embedded in the voltage-to-earth signal Ve in a form of a frequency and communicated. Therefore, because a communication system used for it does not depend on the impedance of the power supply line, it is unnecessary to separately adjust a signal level and universality of communication can be improved.

Alternatively, the power converting apparatus 910 on the transmission side shown in FIG. 17 modulates the magnitude of the amplitude of the voltage-to-earth signal according to the information to be transmitted. Therefore, when a single surge or the like flows in from the outside, the surge affects the amplitude. Therefore, there is a concern about occurrence of a communication error.

On the other hand, in the first embodiment, the communication system does not depend on the amplitude of the voltage-to-earth signal and in that system, even if the amplitude temporarily changes, the amplitude does not affect the communication. Therefore, reliability of communication is less easily deteriorated.

Alternatively, if the power converting apparatus 910 on the transmission side shown in FIG. 17 is used to perform multi-value communication, it is necessary to increase the number of sets of components corresponding to the impedance element 943, the switching element 942, the driving circuit 941 and the ON/OFF control unit 941a, by the incremental number of bit values. Consequently, the power converting apparatus 910 on the transmission side is further increased in size, and the manufacturing costs for the power converting apparatus 910 on the transmission side tend to further increase.

On the other hand, in the first embodiment, in the power converting system 1, in the frequency modulating unit 12a of the PWM-carrier-signal generating unit 12, the correlation information between the bit values, which the voltage-to-earth signal Ve can take, and the candidate frequencies is set in advance for the candidate frequencies (or the candidate frequency range). In the demodulating unit 28, the correlation information between the possible bit values and the candidate frequencies, which correspond to that set in the frequency modulating unit 12a is set in advance for the candidate frequencies. In this way, by updating the correlation information set in the frequency modulating unit 12a and the correlation information set in the demodulating unit 28, it is possible to increase the number of bit values that the voltage-to-earth signal Ve to be transmitted can take. In other words, it is possible to increase the number of bit values that the voltage-to-earth signal Ve to be transmitted can take, without updating hardware. Therefore, it is possible to easily realize multi-value communication. In other words, it is possible to realize multi-value communication while suppressing increase in manufacturing cost for the power converting apparatus 10 on the transmission side.

Information concerning a frequency command simultaneously embedded in a PWM wave is usually as sufficiently small as about 1/100 of the frequency of a PWM carrier wave and does not affect information communication. For example, in the case of a motor operation, it is conceivable that the frequency command is set to 60 Hz. However, because a carrier wave frequency is usually in kilohertz order, the frequency command is easily discriminated on the reception side.

The switching elements 15 of the main circuit 10a may be formed using a wideband gap semiconductor. For example, a SiC element may be applied to the switching elements 15 of the main circuit 10a. Consequently, because the frequency of the carrier wave can be set high, it is possible to substantially expand a usable frequency band, further improve the reliability of communication, and expand the universality.

Figure 6:
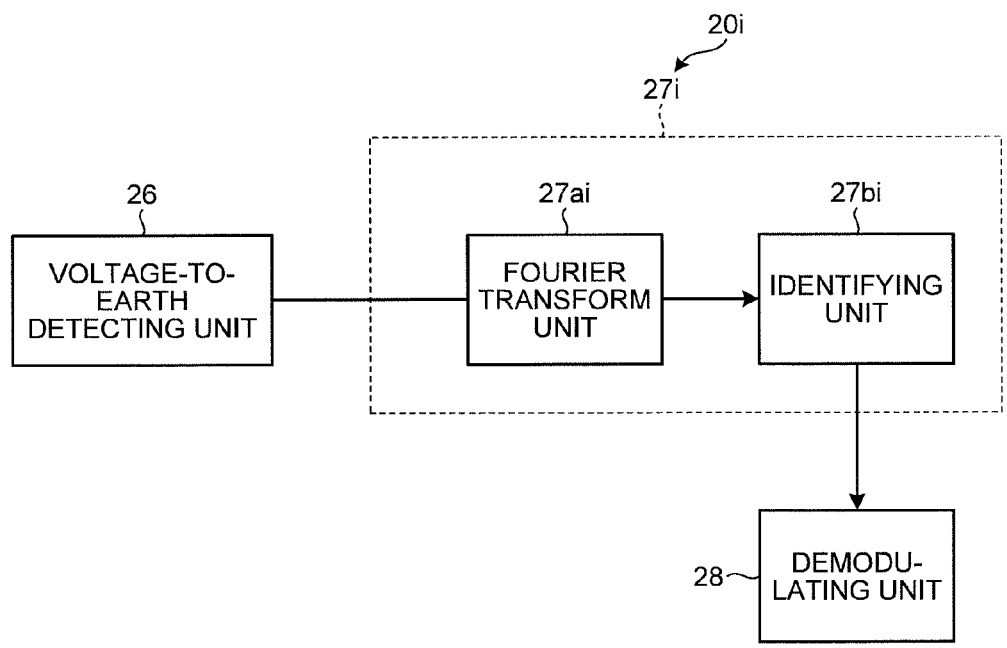
FIG. 6 is a diagram showing a configuration of a carrier-signal-frequency extracting unit in a modification of the first embodiment.

As shown in FIG. 6, a carrier-signal-frequency extracting unit 27i of a power converting apparatus 20i on a reception side may extract a frequency component corresponding to any one frequency of the candidate frequencies (or the candidate frequency range) by subjecting the voltage-to-earth signal Ve detected by the voltage-to-earth detecting unit 26 to frequency analysis. In this case, the carrier-signal-frequency extracting unit 27i includes, for example, a Fourier transform unit 27ai and an identifying unit 27bi. The Fourier transform unit 27ai subjects the voltage-to-earth signal Ve detected by the voltage-to-earth detecting unit 26 to Fourier transform and calculates a frequency spectrum shown in FIG. 7. The identifying unit 27bi identifies a frequency component corresponding to which frequency of the candidate frequencies (or the candidate frequency range) the calculated frequency spectrum is.

For example, when a peak Pk1 appears in a position of the frequency f1b corresponding to the candidate frequency f1 according to the Fourier transform of the Fourier transform unit 27ai, the fact is identified that the specifying unit 27bi specifies that the peak Pk1 is a frequency component corresponding to the candidate frequency f1, i.e., the bit value "0".

For example, when a peak Pk2 appears in a position of the frequency f2b corresponding to the candidate frequency f2 according to the Fourier transform of the Fourier transform unit 27ai, the fact is identified that the peak Pk2 is a frequency component corresponding to the candidate frequency f2, i.e., the bit value "1".

As described, also by subjecting the voltage-to-earth signal Ve detected by the voltage-to-earth detecting unit 26 to frequency analysis, it is possible to extract, from the voltage-to-earth signal Ve, a frequency component corresponding to any one frequency of the candidate frequencies f1 and f2 (or the candidate frequency range FR1) of the carrier signal.

In the first embodiment, illustrative explanation is given for the case where the power converting apparatus 10 and the power converting apparatus 20 are inverters, respectively. However, other forms may be adopted for the converting apparatuses 10 and 20, as long as the power converting apparatus 10 and the power converting apparatus 20 each convert supplied electric power into other electric power and output the converted electric power. For example, the power converting apparatus 10 and the power converting apparatus 20 may be, for example, converters, which each convert supplied alternating-current electric power into direct-current electric power and output the converted direct-current electric power to a predetermined control target (e.g., an inverter). Alternatively, the power converting apparatus 10 and the power converting apparatus 20 may be, for example, step-up choppers or step-down choppers, which each convert supplied direct-current electric power into direct-current electric power having a different power level and output the converted direct-current electric power to a predetermined control target.

Figure 8:
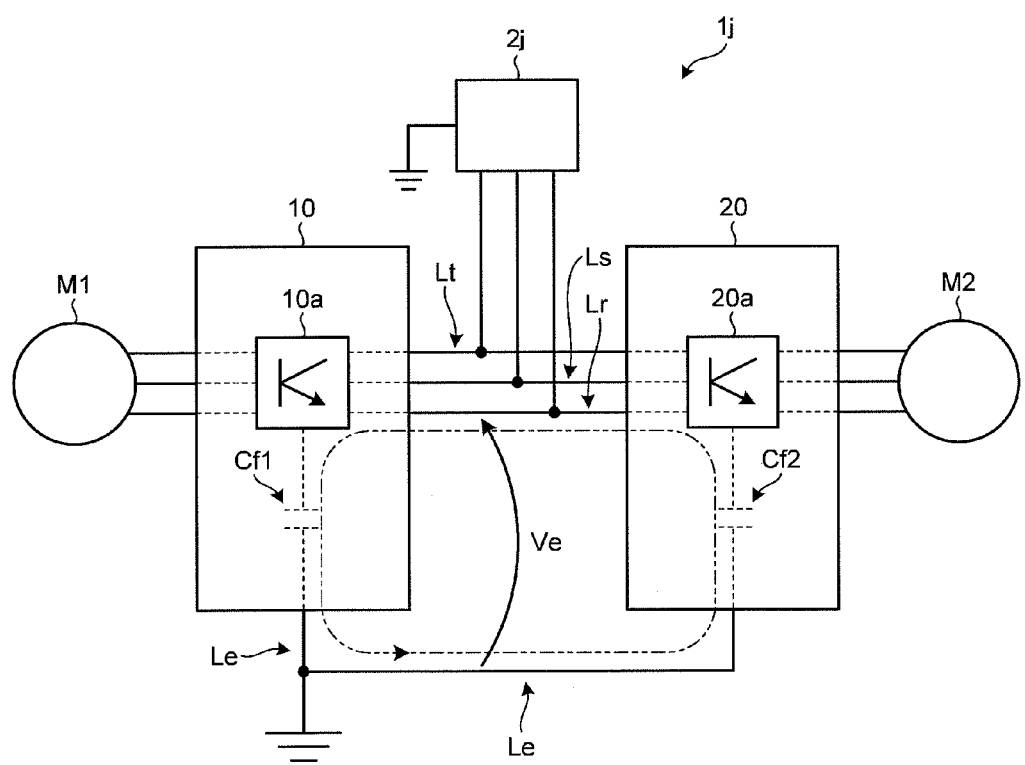
FIG. 8 is a diagram showing a configuration of a power converting system according to another modification of the first embodiment.
Figure 9:
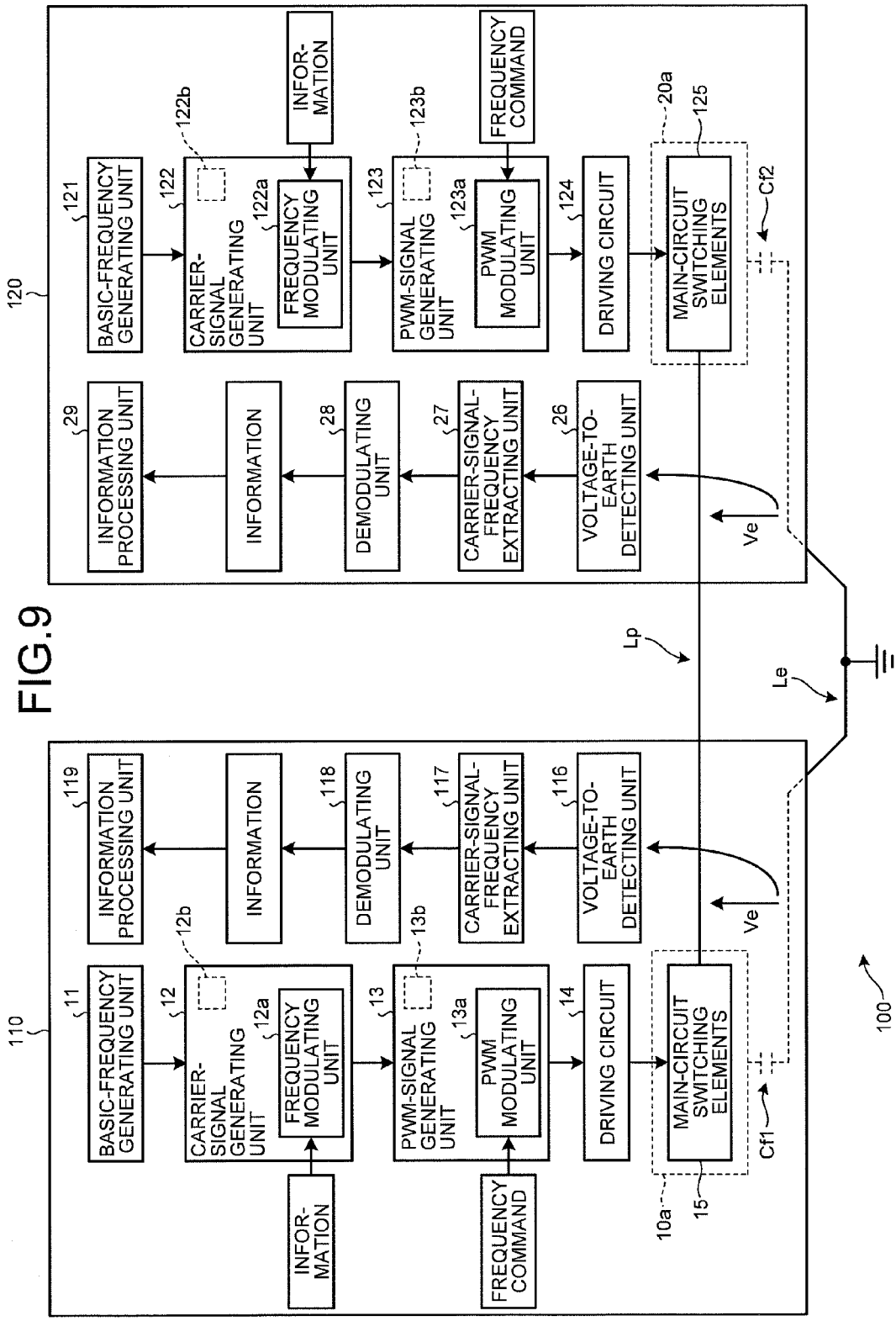
FIG. 9 is a diagram showing a configuration of a power converting system according to a second embodiment.

Alternatively, as shown in FIG. 8, in a power converting system 1j, the power converting apparatus 10 and the power converting apparatus 20 may each receive alternating-current electric power (e.g., three-phase alternating-current electric power) from a power supply apparatus 2j via power supply lines Lr, Ls and Lt, convert the supplied alternating-current power into alternating-current power having a different power level, and output the converted alternating-current power to the control targets M1 and M2.

Second Embodiment

A power converting system 100 according to a second embodiment is described. In the following, differences from the first embodiment are mainly explained.

In the first embodiment, in the power converting system 1, the power converting apparatus 10 is a power converting apparatus on the transmission side and the power converting apparatus 20 is a power converting apparatus on the reception side. However, in the second embodiment, a power converting apparatus 110 and a power converting apparatus 120 bidirectionally perform communication in the power converting system 100.

The power converting apparatus 110 further includes a configuration for receiving a voltage-to-earth signal. Specifically, the power converting apparatus 110 includes a voltage-to-earth detecting unit 116, a carrier-signal-frequency extracting unit 117, a demodulating unit (restoring unit) 118, and an information processing unit 119. Functions of the voltage-to-earth detecting unit 116, the carrier-signal-frequency extracting unit 117, the demodulating unit (restoring unit) 118, and the information processing unit 119 are respectively the same as the functions of the voltage-to-earth detecting unit 26, the carrier-signal-frequency extracting unit 27, the demodulating unit (restoring unit) 28, and the information processing unit 29 (see FIG. 2) in the first embodiment.

The power converting apparatus 120 further includes a configuration for transmitting a voltage-to-earth signal. Specifically, the power converting apparatus 120 includes a basic-frequency generating unit 121, a PWM-carrier-signal generating unit 122, a PWM-signal generating unit 123, a driving circuit 124, and switching elements 125 of the main circuit 20a. Functions of the basic-frequency generating unit 121, the PWM-carrier-signal generating unit 122, the PWM-signal generating unit 123, the driving circuit 124, and the switching elements 125 of the main circuit 20a are respectively the same as the functions of the basic-frequency generating unit 11, the PWM-carrier-signal generating unit 12, the PWM-signal generating unit 13, the driving circuit 14, and the switching elements 15 of the main circuit 20a (see FIG. 2) in the first embodiment.

Figure 10:
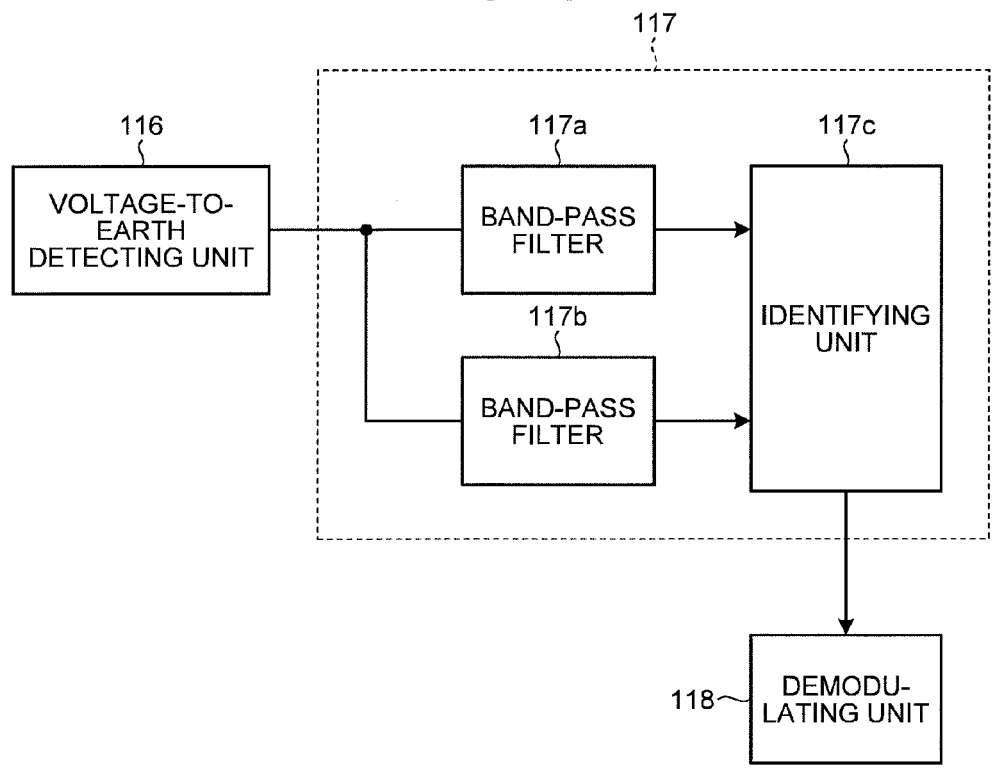
FIG. 10 is a diagram showing a configuration and an operation of a carrier-signal-frequency extracting unit in the second embodiment.

The carrier-signal-frequency extracting unit 117 of the power converting apparatus 110 includes, for example, as shown in FIG. 10, a plurality of band-pass filters 117a and 117b and an identifying unit 117c.

Figure 12:
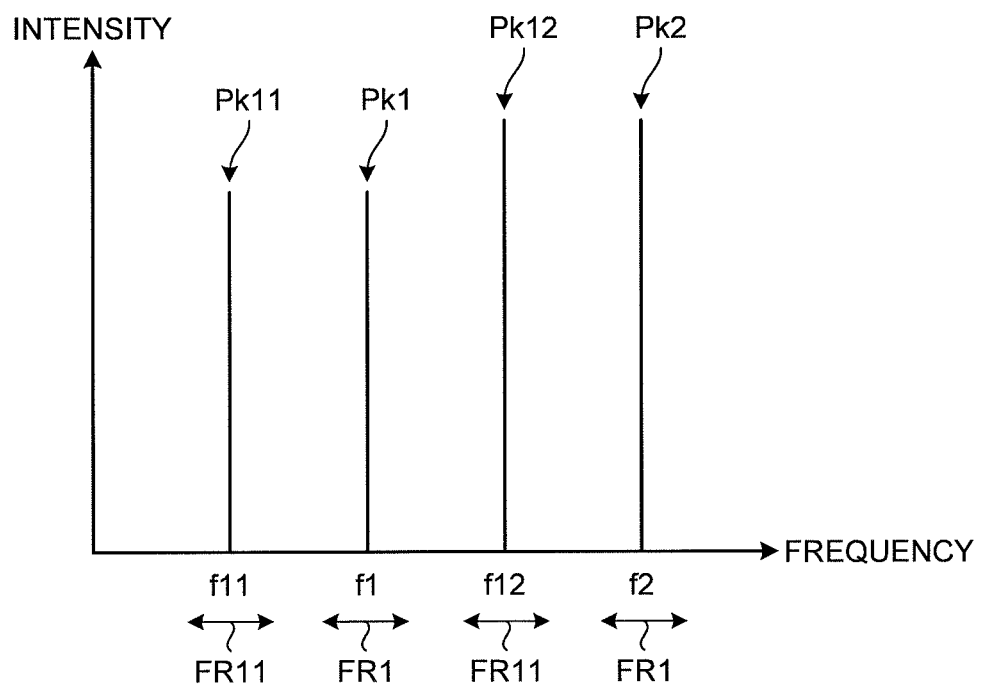
FIG. 12 is a graph showing an operation of the carrier-signal-frequency extracting unit in the modification of the second embodiment.

The band-pass filters 117a and 117b have pass bands corresponding to a plurality of candidate frequencies f11 and f12 (or a candidate frequency range FR11) of a carrier signal of the power converting apparatus 120. The candidate frequencies f11 and f12 (or the candidate frequency range FR11) of the carrier signal of the power converting apparatus 120 are set to not overlap the candidate frequencies f1 and f2 of the carrier signal of the power converting apparatus 110 and to have differences such that the candidate frequencies can be distinguished from each other (see FIG. 12).

For example, the band-pass filter 117a has a pass band corresponding to the candidate frequency f11. In other words, the band-pass filter 117a has a pass band corresponding to a bit value "0". For example, the band-pass filter 117b has a pass band corresponding to the candidate frequency f12. In other words, the band-pass filler 117b has a pass band corresponding to a bit value "1".

When the identifying unit 117c receives a signal from one of the band-pass filters 117a and 117b, the identifying unit 117c identifies a frequency component corresponding to which frequency of the candidate frequencies the received signal is.

For example, when the identifying unit 117c receives a frequency component of the frequency f1b from the band-pass filter 117a, the identifying unit 117c identifies the fact that the frequency component is a frequency component corresponding to the candidate frequency f1, i.e., the bit value "0". For example, when the identifying unit 117c receives a frequency component of the frequency f2b from the band-pass filter 117b, the identifying unit 117c identifies the fact that the frequency component is a frequency component corresponding to the candidate frequency f2, i.e., the bit value "1".

The carrier-signal-frequency extracting unit 117 extracts a frequency component corresponding to any one frequency of the candidate frequencies f11 and f12 (or candidate frequency range FR11) by causing the voltage-to-earth signal Ve to pass through the band-pass filters 117a and 117b. The carrier-signal-frequency extracting unit 117 supplies the extracted frequency component to the demodulating unit 118.

As explained above, in the second embodiment, the power converting apparatus 110 further includes the configuration for receiving a voltage-to-earth signal, the power converting apparatus 120 further includes the configuration for transmitting the voltage-to-earth signal, wherein the candidate frequencies f1 and f2 (or the candidate frequency range FR1) of the carrier signal of the power converting apparatus 110 and the candidate frequencies f11 and f12 (or the candidate frequency range FR11) of the carrier signal of the power converting apparatus 120 have differences (or frequency intervals) such that the candidate frequencies f1 and f2 and the candidate frequencies f11 and f12 can be distinguished from each other. Consequently, the power converting apparatus 110 and the power converting apparatus 120 can bidirectionally perform communication.

Figure 11:
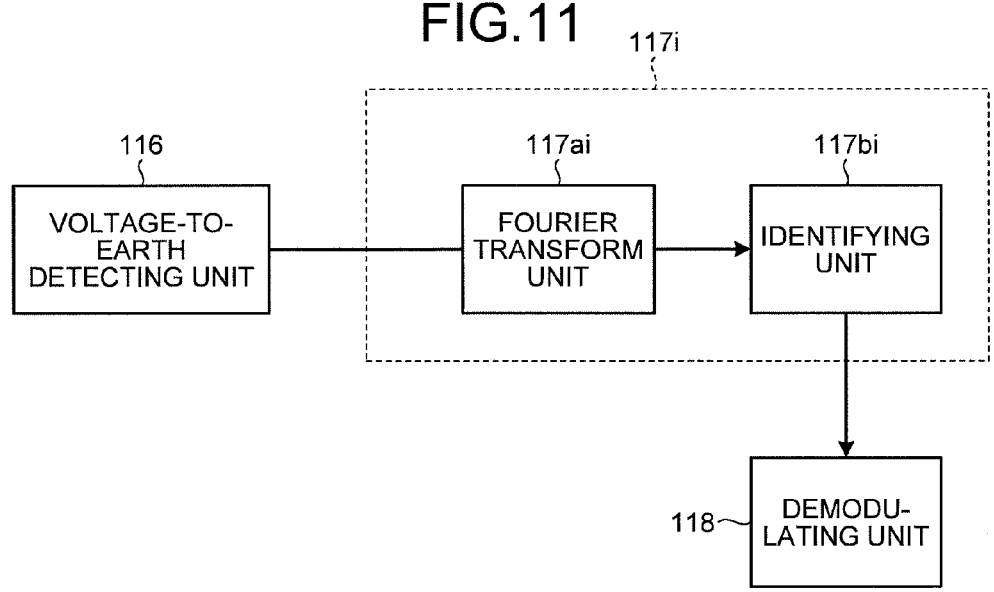
FIG. 11 is a diagram showing a configuration of a carrier-signal-frequency extracting unit in a modification of the second embodiment.

As shown in FIG. 11, a carrier-signal-frequency extracting unit 117i can extract a frequency component corresponding to any one frequency of the candidate frequencies (or the candidate frequency range) by subjecting the voltage-to-earth signal Ve detected by the voltage-to-earth detecting unit 116 to frequency analysis. In this case, the carrier-signal-frequency extracting unit 117i includes, for example, a Fourier transform unit 117ai and an identifying unit 117bi. The Fourier transform unit 117ai subjects the voltage-to-earth signal Ve detected by the voltage-to-earth detecting unit 116 to Fourier transform and calculates a frequency spectrum shown in FIG. 12. The identifying unit 117bi identifies a frequency component corresponding to which frequency of the candidate frequencies f11 and f12 (or the candidate frequency range FR11) the calculated frequency spectrum is.

For example, when a peak Pk11 appears in a position of a frequency corresponding to the candidate frequency f11 according to the Fourier transform of the Fourier transform unit 117ai, the identifying unit 117bi identifies the fact that the peak Pk11 is a frequency component corresponding to the candidate frequency f11, i.e., the bit value "0".

For example, when a peak Pk12 appears in a position of a frequency corresponding to the candidate frequency f12 according to the Fourier transform of the Fourier transform unit 117ai, the identifying unit 117bi identifies the fact that the peak Pk12 is a frequency component corresponding to the candidate frequency f2, i.e., the bit value "1".

In this way, also by subjecting the voltage-to-earth signal Ve detected by the voltage-to-earth detecting unit 116 to frequency analysis, it is possible to extract, from the voltage-to-earth signal Ve, a frequency component corresponding to any one frequency of the candidate frequencies f11 and f12 of the carrier signal.

Third Embodiment

A power converting system 200 according to a third embodiment is explained. In the following explanation, differences from the first embodiment are mainly explained.

Figure 13:
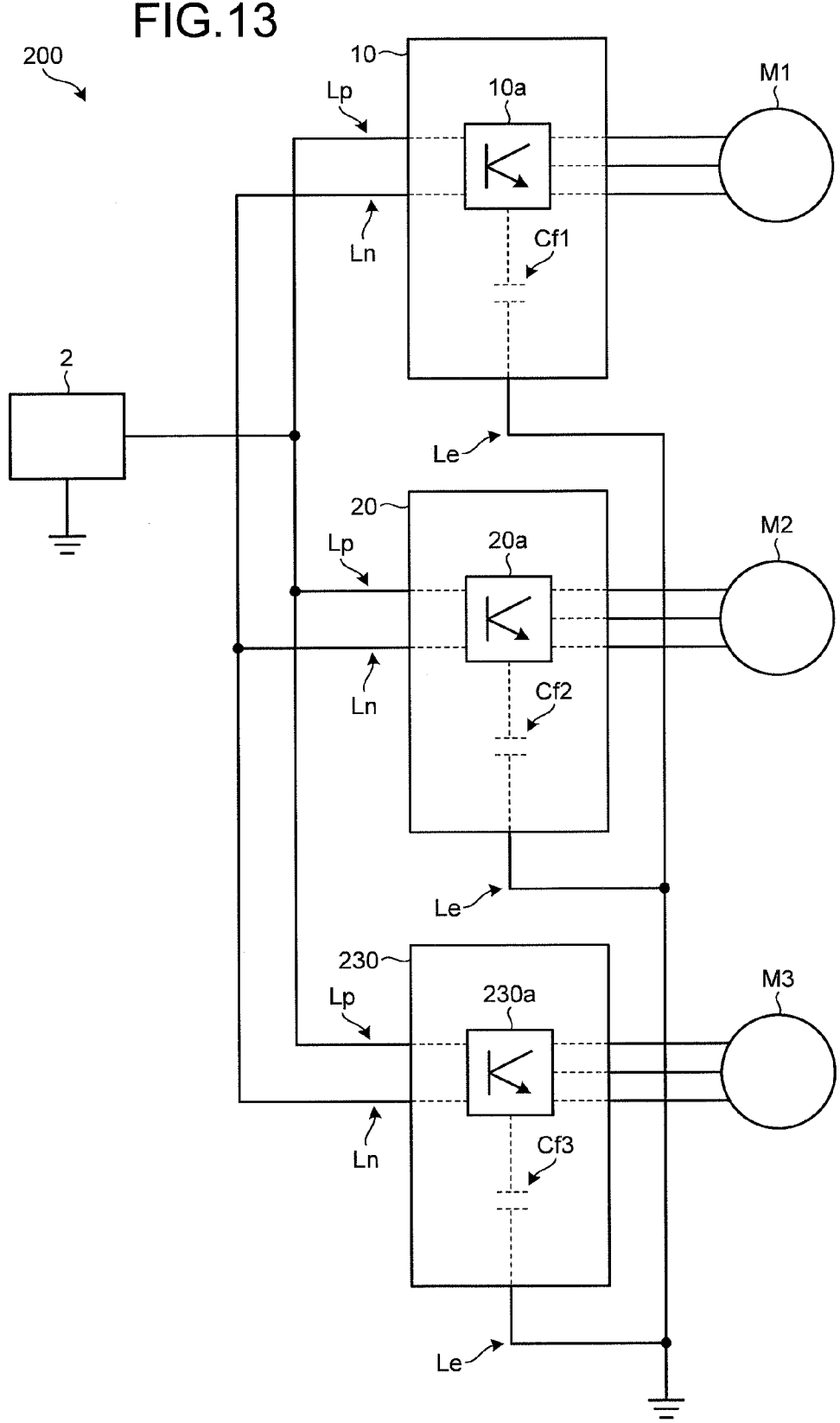
FIG. 13 is a diagram showing a configuration of a power converting system according to a third embodiment.

In the first embodiment, the power converting system 1 includes one power converting apparatus 10 on the transmission side and one power converting apparatus 20 on the reception side. However, in the third embodiment, the power converting system 200 includes one power converting apparatus 10 on the transmission side and a plurality of apparatus on the reception side, that is, power converting apparatuses 20 and 230 (see FIG. 13).

In other words, the power converting system 200 further includes the power converting apparatus 230. The power converting apparatus 10, the power converting apparatus 20, and the power converting apparatus 230 are connected in common by the same power supply line Lp, connected in common by the same power supply line Ln, and connected in common by the same earth line Le.

The power converting apparatus 230 is connected to the power supply apparatus 2, the power converting apparatus 10, and the power converting apparatus 20 via the power supply line Lp and the power supply line Ln. The power converting apparatus 230 is connected to the ground potential via the earth line Le. The power converting apparatus 230 is connected to a control target M3 via power lines Lu3, Lv3, and Lw3.

The power converting apparatus 230 receives direct-current power from the power supply apparatus 2 via the power supply line Lp and the power supply line Ln. The power converting apparatus 230 performs a power converting operation for converting direct-current electric power into alternating-current electric power in a main circuit 230a. Specifically, a plurality of switching elements (see FIG. 4) in the main circuit 230a are turned on and off at predetermined timings, respectively. The power converting apparatus 230 supplies the converted alternating-current electric power to the control target M3. Consequently, the power converting apparatus 230 controls to drive the control target M3.

In the power converting apparatus 230, the main circuit 230a and the earth line Le are equivalently connected via a stray capacitance Cf3. Consequently, when the switching elements 15 (see FIG. 2) in the main circuit 10a of the power converting apparatus 10 are turned on or off, the voltage-to-earth signal Ve (see FIG. 3(c)) is communicated to not only the power converting apparatus 20 but also the power converting apparatus 230 via, for example, the power supply line Lp and the earth line Le. Then, in this embodiment, making use of this fact, the voltage-to-earth signal Ve (see FIG. 3(c)) corresponding to predetermined information is transmitted from the power converting apparatus 10 to the power converting apparatus 20 and the power converting apparatus 230. In other words, in this embodiment, the power converting apparatus 10 functions as a power converting apparatus on the transmission side, and the power converting apparatus 20 and the power converting apparatus 230 function as power converting apparatuses on the reception side.

In this way, in the third embodiment, predetermined information can be simultaneously distributed from the power converting apparatus 10 to the power converting apparatus 20 and the power converting apparatus 230.

In the illustrative explanation in the third embodiment, two power converting apparatuses are provided on the reception side. However, three or more power converting apparatuses may be provided on the reception side.

Fourth Embodiment

A power converting system 300 according to a fourth embodiment is explained. In the following, differences from the first and third embodiments are mainly explained.

In the first embodiment, the power converting system 1 includes one power converting apparatus 10 on the transmission side and one power converting apparatus 20 on the reception side. However, in the fourth embodiment, the power converting system 300 includes a plurality of power converting apparatuses 10 and 230 (see FIG. 13) on the transmission side and one power converting apparatus 320 (see FIG. 14) on the reception side.

In the power converting system 300, because the plurality of apparatuses on the transmission side, that is, power converting apparatuses 10 and 230 are present, the power converting apparatus 320 on the reception side needs to determine from which of the power converting apparatuses 10 and 230 on the transmission side a signal is transmitted.

Figure 14:
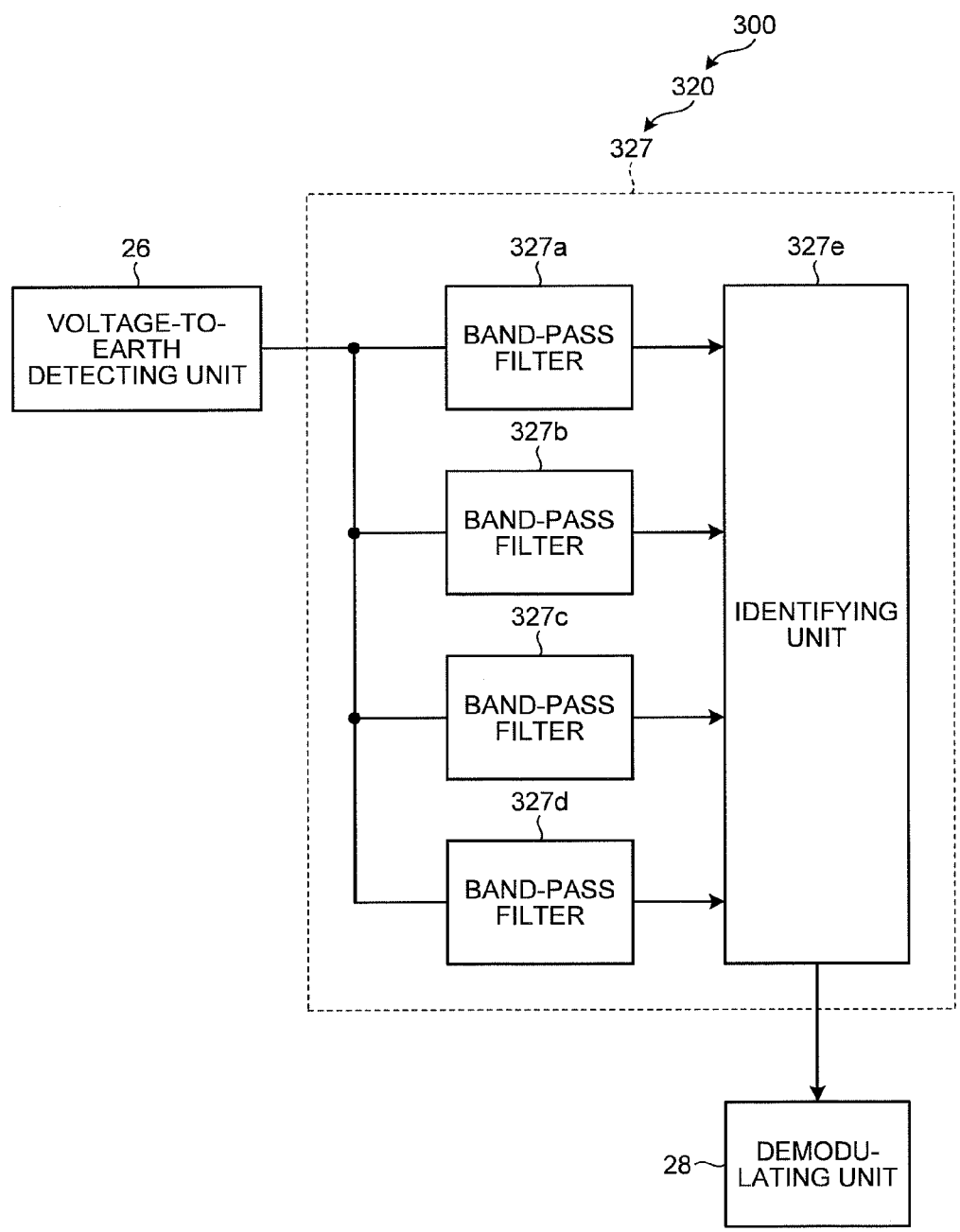
FIG. 14 is a diagram showing a configuration and an operation of a carrier-signal-frequency extracting unit in a fourth embodiment.

Therefore, the power converting apparatus 320 on the reception side includes, for example, as shown in FIG. 14, a plurality of band-pass filters 327a and 327b corresponding to the candidate frequencies f1 and f2 of the carrier signal of the power converting apparatus 10, a plurality of band-pass filters 327c and 327d corresponding to the candidate frequencies f11 and f12 of the carrier signal of the power converting apparatus 230, and an identifying unit 327e.

The band-pass filters 327a and 327b have pass bands corresponding to the candidate frequencies f1 and f2 (or the candidate frequency range FR1) of the carrier signal of the power converting apparatus 10. The band-pass filters 327c and 327d have pass bands corresponding to the candidate frequencies f11 and f12 (or the candidate frequency range FR11) of the carrier signal of the power converting apparatus 230. The candidate frequencies f11 and f12 (or the candidate frequency range FR11) of the carrier signal of the power converting apparatus 230 are beforehand set to not overlap the candidate frequencies f1 and f2 (or the candidate frequency range FR1) of the carrier signal of the power converting apparatus 10 and to have differences such that the candidate frequencies f1 and f2 and the candidate frequencies f11 and f12 can be distinguished from each other (see FIG. 12).

When the identifying unit 327e receives a signal from any one of the band-pass filters 327a, 327b, 327c and 327d, the identifying unit 327e identifies from which power converting apparatus the received signal has been transmitted and identifies a frequency component corresponding to which frequency of the candidate frequencies of the identified one's power converting apparatus the signal is.

A carrier-signal-frequency extracting unit 327 extracts a frequency component corresponding to any one frequency of the candidate frequencies f1, f2, f11 and f12 (or the candidate frequency ranges FR1 and FR11) by causing the voltage-to-earth signal Ve to pass through the band-pass filters 327a, 327b, 327c and 327d. The carrier-signal-frequency extracting unit 327 supplies the extracted frequency component to the demodulating unit 28.

As explained above, in the fourth embodiment, in the power converting system 300 in which the voltage-to-earth signal Ve can be transmitted from the power converting apparatuses 10 and 230 on the transmission side to the power converting apparatus 320 on the reception side, the candidate frequencies f1 and f2 (or the candidate frequency range FR1) of the carrier signal of the power converting apparatus 10 and the candidate frequencies f11 and f12 (or the candidate frequency range FR11) of the carrier signal of the power converting apparatus 230 have differences such that the candidate frequencies f1 and f2 and the candidate frequencies f11 and f12 can be distinguished from each other. Consequently, the power converting apparatus 320 on the reception side can correctly receive information from each of the power converting apparatus 10 and the power converting apparatus 230.

In the illustrative explanation in the fourth embodiment, two power converting apparatuses are provided on the transmission side. However, three or more power converting apparatuses may be provided on the transmission side. In that case, candidate frequencies of carrier signals of the power converting apparatuses on the transmission side are set in advance to not overlap one another and to have differences such that the candidate frequencies can be distinguished from one another. Consequently, the power converting apparatus 320 on the reception side can correctly receive information from each of the power converting apparatuses on the transmission side.

In the illustrative explanation in the fourth embodiment, one power converting apparatus is provided on the reception side. However, two or more power converting apparatuses may be provided on the reception side. Alternatively, in a modification of the fourth embodiment, two or more power converting apparatuses may be provided on the reception side.

Fifth Embodiment

A power converting system 400 according to a fifth embodiment is explained. In the following, differences from the second embodiment are mainly explained.

In the second embodiment, the two power converting apparatuses 110 and 120 bidirectionally perform communication in the power converting system 100. However, in the fifth embodiment, three or more power converting apparatuses 410 (see FIG. 15), 20 (see FIG. 1), and 230 (see FIG. 13) bidirectionally perform communication in the power converting system 400.

In the power converting system 400, for example, when viewed from the power converting apparatus 410, the plurality of apparatuses, the power converting apparatuses 20 and 230 that can be on a transmission side are present. Therefore, in the power converting apparatus 410 that can be on a reception side, it is necessary to determine from which of the power converting apparatuses 20 and 230 a signal is transmitted.

Figure 15:
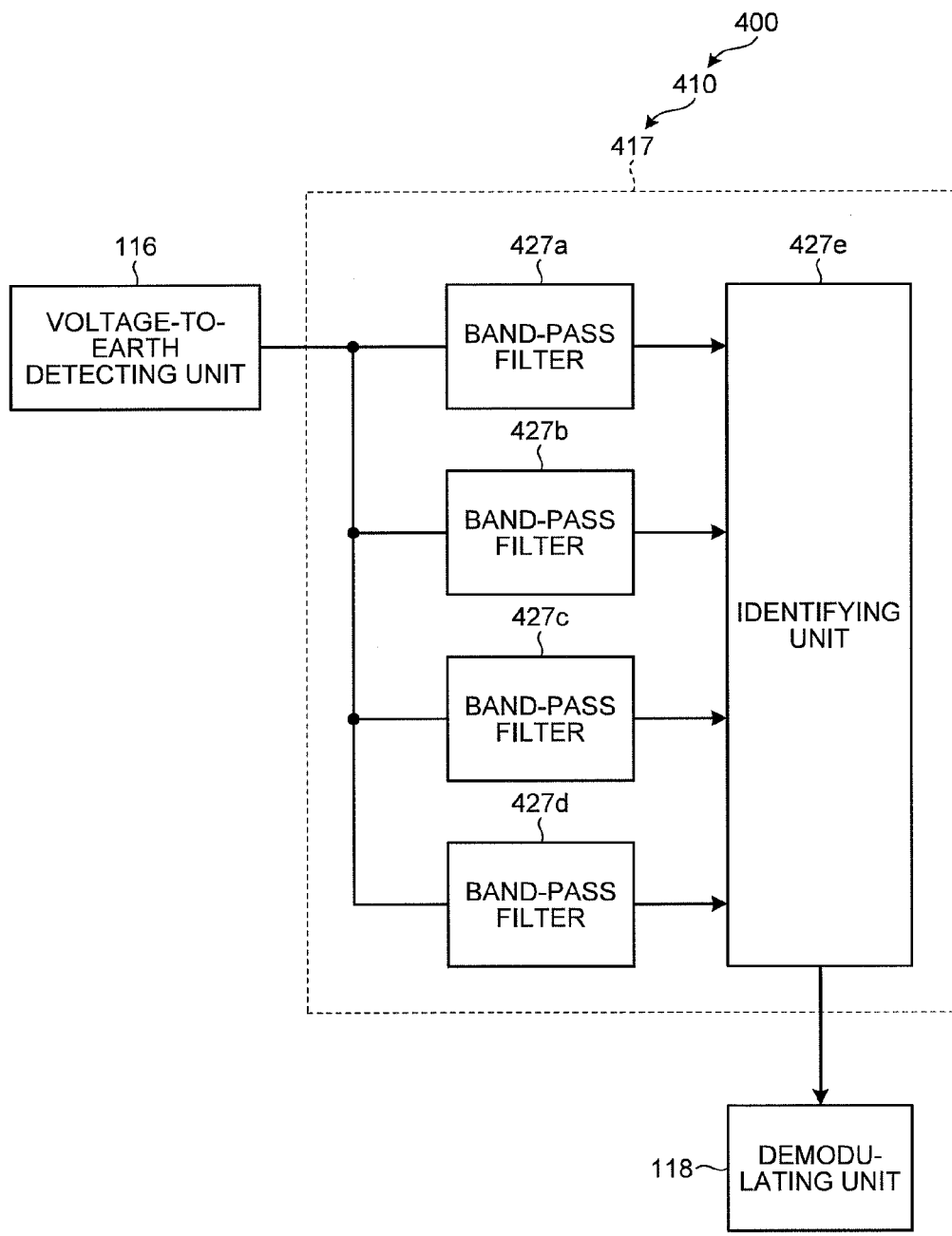
FIG. 15 is a diagram showing a configuration and an operation of a carrier-signal-frequency extracting unit in a fifth embodiment.

Therefore, the power converting apparatus 410 on the reception side includes, for example, as shown in FIG. 15, a plurality of band-pass filters 427a and 427b corresponding to a plurality of candidate frequencies f21 and f22 (or a candidate frequency range FR21) (see FIG. 16) of a carrier signal of the power converting apparatus 20, a plurality of band-pass filters 427c and 427d corresponding to the candidate frequencies f11 and f12 (or the candidate frequency range FR11) of a carrier signal of the power converting apparatus 230, and an identifying unit 427e.

The band-pass filters 427a and 427b have pass bands corresponding to the candidate frequencies f21 and f22 (or the candidate frequency range FR21) of the carrier signal of the power converting apparatus 20. The band-pass filters 427c and 427d have pass bands corresponding to the candidate frequencies f11 and f12 (or the candidate frequency range FR11) of the carrier signal of the power converting apparatus 230. The candidate frequencies f21 and f22 (or the candidate frequency range FR21) of the carrier signal of the power converting apparatus 20 are set in advance to not overlap both the candidate frequencies f1 and f2 (or the candidate frequency range FR1) of the carrier signal of the power converting apparatus 410 and the candidate frequencies f11 and f12 (or the candidate frequency range FR11) of the carrier signal of the power converting apparatus 230 and to have differences such that the candidate frequencies f21 and f22 and the candidate frequencies f1, f2, f11 and f12 can be distinguished from each other (see FIG. 16).

When the identifying unit 427e receives a signal from any one of the band-pass filters 427a, 427b, 427c and 427d, the identifying unit 427e identifies from which power converting apparatus the received signal is transmitted and identifies a frequency component corresponding to which frequency of the candidate frequencies of the identified one's power converting apparatus the signal is.

A carrier-signal-frequency extracting unit 417 extracts a frequency component corresponding to any one frequency of the candidate frequencies f1, f2, f21, f22, f11 and f12 (or the candidate frequency ranges FR1, FR11 and FR21) by causing the voltage-to-earth signal Ve to pass through the band-pass filters 427a, 427b, 427c and 427d. The carrier-signal-frequency extracting unit 417 supplies the extracted frequency component to the demodulating unit 118.

The power converting apparatus 410 is illustratively explained. However, the same applies to the other power converting apparatuses 20 and 230.

As explained above, in the fifth embodiment, the candidate frequencies f1 and f2 (or the candidate frequency range FR1) of the carrier signal of the power converting apparatus 410, the candidate frequencies f21 and f22 (or the candidate frequency range FR21) of the carrier signal of the power converting apparatus 20, and the candidate frequencies f11 and f12 (or the candidate frequency range FR11) of the carrier signal of the power converting apparatus 230 have differences such that the candidate frequencies or frequency ranges can be distinguished from one another. Consequently, when information is bidirectionally transmitted and received among three or more power converting apparatuses, the information can be correctly communicated.

Figure 16:
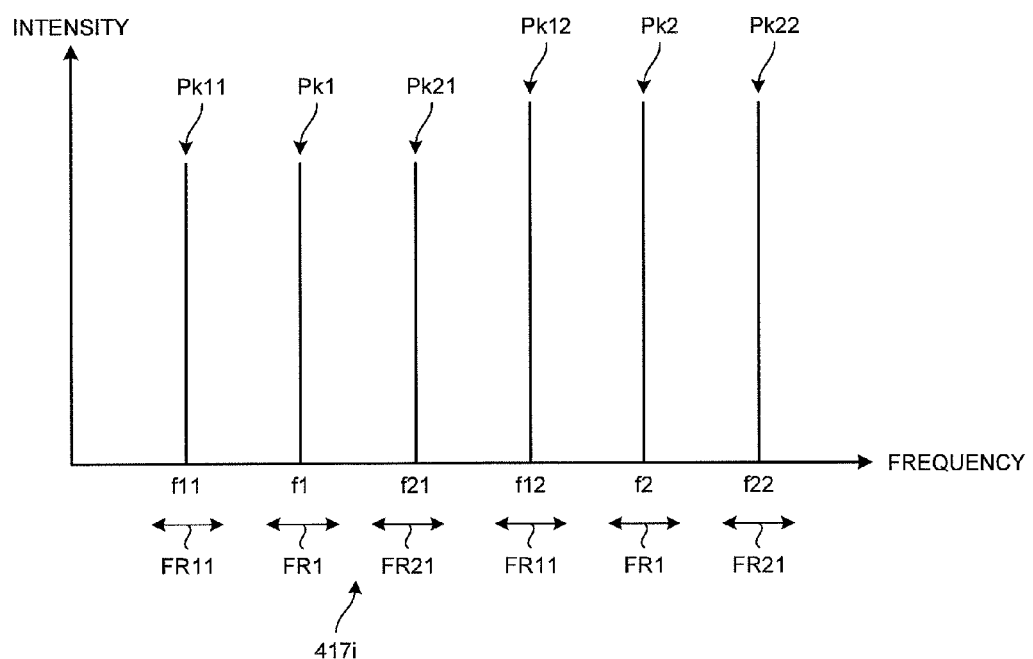
FIG. 16 is a graph showing an operation of a carrier-signal-frequency extracting unit in a modification of the fifth embodiment.

As shown in FIG. 16, a carrier-signal-frequency extracting unit 417i may extract a frequency component corresponding to any one frequency of the candidate frequencies (or the candidate frequency range) with subjecting the voltage-to-earth signal Ve detected by the voltage-to-earth detecting unit 116 to frequency analysis. In this case, the carrier-signal-frequency extracting unit 417i includes, for example, a Fourier transform unit and an identifying unit (see FIG. 11). The Fourier transform unit subjects the voltage-to-earth signal Ve detected by the voltage-to-earth detecting unit 116 to Fourier transform and calculates a frequency spectrum shown in FIG. 16. The identifying unit identifies from which power converting apparatus the calculated frequency spectrum is transmitted and identifies a frequency component corresponding to which frequency of the candidate frequencies of the identified one's power converting apparatus the calculated frequency spectrum is.

In this way, also by subjecting the voltage-to-earth signal Ve detected by the voltage-to-earth detecting unit to frequency analysis, it is possible to extract, from the voltage signal-to-earth Ve, a frequency component corresponding to any one frequency of the candidate frequencies f1, f2, f21, f22, f11 and f12 (or the candidate frequency ranges FR1, FR11 and FR21) of the carrier signals.

In the example explained in the fifth embodiment, three power converting apparatuses are connected in common by the same power supply lines Lp and Ln and the same earth line Le. However, four or more power converting apparatuses connected in common by the same power supply lines Lp and Ln and the same earth line Le may be provided.

INDUSTRIAL APPLICABILITY

As explained above, the power converting apparatus and the power converting system according to the present invention are useful for communication among a plurality of power converting apparatuses.

REFERENCE SIGNS LIST

1 POWER CONVERTING SYSTEM
2 POWER SUPPLY APPARATUS

10 POWER CONVERTING APPARATUS
10a MAIN CIRCUIT
11 BASIC-FREQUENCY GENERATING UNIT
12 PWM-CARRIER-SIGNAL GENERATING UNIT
12a FREQUENCY MODULATING UNIT
12b GENERATING UNIT
13 PWM-SIGNAL GENERATING UNIT
13a PWM MODULATING UNIT
13b GENERATING UNIT
14 DRIVING CIRCUIT
15 SWITCHING ELEMENTS
20 POWER CONVERTING APPARATUS
20a MAIN CIRCUIT
26 VOLTAGE-TO-EARTH DETECTING UNIT
27 CARRIER-SIGNAL-FREQUENCY EXTRACTING UNIT
27a, 27b BAND-PASS FILTER
27ai FOURIER TRANSFORM UNIT
27c IDENTIFYING UNIT
28 DEMODULATING UNIT
29 INFORMATION PROCESSING UNIT
100 POWER CONVERTING SYSTEM
110 POWER CONVERTING APPARATUS
116 VOLTAGE-TO-EARTH DETECTING UNIT
117, 117i CARRIER-SIGNAL-FREQUENCY EXTRACTING UNIT
117a, 117b BAND-PASS FILTER
117ai FOURIER TRANSFORM UNIT
117c IDENTIFYING UNIT
118 DEMODULATING UNIT
119 INFORMATION PROCESSING UNIT
120 POWER CONVERTING APPARATUS
121 BASIC-FREQUENCY GENERATING UNIT
122 PWM-CARRIER-SIGNAL GENERATING UNIT
123 PWM-SIGNAL GENERATING UNIT
124 DRIVING CIRCUIT
125 SWITCHING ELEMENT
200 POWER CONVERTING SYSTEM
230 POWER CONVERTING APPARATUS
230a MAIN CIRCUIT
300 POWER CONVERTING SYSTEM
320 POWER CONVERTING APPARATUS
327 CARRIER-SIGNAL FREQUENCY EXTRACTING UNIT
327a to 327d BAND-PASS FILTER
327e IDENTIFYING UNIT
400 POWER CONVERTING SYSTEM
410 POWER CONVERTING APPARATUS
417, 417i CARRIER-SIGNAL-FREQUENCY EXTRACTING UNIT
427a to 427d BAND-PASS FILTER
427e IDENTIFYING UNIT
910 POWER CONVERTING APPARATUS
912 CARRIER-SIGNAL GENERATING UNIT
940 CIRCUIT CONFIGURATION
941 DRIVING CIRCUIT
941a ON/OFF CONTROL UNIT
942 SWITCHING ELEMENT
943 IMPEDANCE ELEMENT
944 IMPEDANCE ELEMENT
Cf1, Cf2, Cf3 STRAY CAPACITANCE
M1, M2, M3 CONTROL TARGET

The invention claimed is:

1. A power converting system comprising:
a first power converting apparatus configured to convert an input power supplied via a power supply line into a first drive power and supply the first drive power to a first control target to drive the first control target; and
a second power converting apparatus configured to convert the input power supplied via the power supply line into a second drive power and supply the second drive power to a second control target to drive the second control target, wherein the first power converting apparatus and the second power converting apparatus are connected with each other via the power supply line and an earth line,
wherein the first power converting apparatus includes:
a first carrier-signal generating unit configured to select, depending on first information to be transmitted to the second power converting apparatus, a first frequency from a plurality of first candidate frequencies or a first candidate frequency range and generate a first carrier signal having the selected first frequency;
a first PWM-signal generating unit configured to generate a first PWM signal using the generated first carrier signal; and
a first switching element connected to the power supply line and configured to perform switching according to the generated first PWM signal to convert the supplied input power into the first drive power,
wherein a first voltage-to-earth signal corresponding to the selected first frequency depending on the first information is transmitted to the second power converting apparatus via the power supply line and the earth line, and
wherein the second power converting apparatus includes:
a second detecting unit configured to detect the first voltage-to-earth signal via the power supply line and the earth line;
a second extracting unit configured to extract a component of the first frequency from the detected first voltage-to-earth signal; and
a second restoring unit configured to restore the first information based on the extracted component of the first frequency.

2. The power converting system according to claim 1, wherein the second power converting apparatus includes:
a second carrier-signal generating unit configured to select, depending on second information to be transmitted to the first power converting apparatus, a second frequency from a plurality of second candidate frequencies or a second candidate frequency range and generate a second carrier signal having the selected second frequency;
a second PWM-signal generating unit configured to generate a second PWM signal using the generated second carrier signal; and
a second switching element connected to the power supply line and configured to perform switching according to the generated second PWM signal to convert the supplied input power into the second drive power,
wherein a second voltage-to-earth signal corresponding to the selected second frequency depending on the second information is transmitted to the first power converting apparatus via the power supply line and the earth line as a result of the switching by the second switching element, and
wherein the first power converting apparatus includes:
a first detecting unit configured to detect the second voltage-to-earth signal via the power supply line and the earth line;
a first extracting unit configured to extract a component of the second frequency from the detected second voltage-to-earth signal; and a first restoring unit configured to restore the second information based on the extracted component of the second frequency.

3. The power converting system according to claim 2, wherein the first candidate frequencies or the first candidate frequency range and the second candidate frequencies or the second candidate frequency range are adjusted not to overlap each other.

4. The power converting system according to claim 2, further comprising a third power converting apparatus configured to convert a third input power supplied via the power supply line into a third drive power and supply the third drive power to a third control target to drive the third control target,
wherein the third power converting apparatus is connected to the first power converting apparatus and the second power converting apparatus via the power supply line and the earth line, wherein
the third power converting apparatus includes:
a third carrier-signal generating unit configured to select, depending on third information to be transmitted to the first power converting apparatus or the second power converting apparatus, a third frequency from a plurality of third candidate frequencies or a third candidate frequency range and generate a third carrier signal having the selected third frequency;
a third PWM-signal generating unit configured to generate a third PWM signal using the generated third carrier signal;
a third switching element connected to the power supply line and configured to perform switching according to the generated third PWM signal to convert the supplied third input power into the third drive power, wherein a third voltage-to-earth signal corresponding to the selected third frequency depending on the third information is transmitted to the first power converting apparatus or the second power converting apparatus via the power supply line and the earth line as a result of the switching by the third switching element;
a third detecting unit configured to detect the first voltage-to-earth signal or the second voltage-to-earth signal via the power supply line and the earth line;
a third extracting unit configured to extract a component of the first frequency or the second frequency from the detected first voltage-to-earth signal or the detected second voltage-to-earth signal; and
a third restoring unit configured to restore the first information or the second information, based on the extracted frequency component of the first frequency or the second frequency.

5. The power converting system according to claim 4, wherein the first candidate frequencies or the first candidate frequency range, the second candidate frequencies or the second candidate frequency range, and the third candidate frequencies or the third candidate frequency range are adjusted not to overlap each other.

6. The power converting system according to claim 1, wherein the first switching element is formed using a wideband gap semiconductor material.

7. The power converting system according to claim 1, wherein the second extracting unit includes a plurality of band-pass filters corresponding to the first candidate frequencies or the first candidate frequency range, and extracts the component of the first frequency by causing the detected first voltage-to-earth signal to pass through the band-pass filters.

8. The power converting system according to claim 1, wherein the second extracting unit extracts the component of the first frequency by subjecting the detected first voltage-to-earth signal to frequency analysis.

9. The power converting system according to claim 1, further comprising a third power converting apparatus configured to convert a third input power supplied via the power supply line into a third drive power and supply the third drive power to a third control target to drive the third control target,
wherein the third power converting apparatus is connected to the first power converting apparatus and the second power converting apparatus via the power supply line and the earth line, wherein
the third power converting apparatus includes:
a third carrier-signal generating unit configured to select, depending on third information to be transmitted to the first power converting apparatus or the second power converting apparatus, a third frequency from a plurality of third candidate frequencies or a third candidate frequency range and generate a third carrier signal having the selected third frequency;
a third PWM-signal generating unit configured to generate a third PWM signal using the generated third carrier signal; and
a third switching element connected to the power supply line and configured to perform switching according to the generated third PWM signal to convert the supplied third input power into the third drive power,
wherein a third voltage-to-earth signal corresponding to the selected third frequency depending on the third information is transmitted to the first power converting apparatus or the second power converting apparatus via the power supply line and the earth line as a result of the switching by the third switching element.

10. The power converting system according to claim 9, wherein the first candidate frequencies or the first candidate frequency range and the third candidate frequencies or the third candidate frequency range are adjusted not to overlap each other.

11. The power converting system according to claim 1, further comprising a third power converting apparatus configured to convert a third input power supplied via the power supply line into a third drive power and supply the third drive power to a third control target to drive the third control target,
wherein the third power converting apparatus is connected to the first power converting apparatus and the second power converting apparatus via the power supply line and the earth line, wherein
the third power converting apparatus includes:
a third detecting unit configured to detect the first voltage-to-earth signal via the power supply line and the earth line;
a third extracting unit configured to extract a component of the first frequency from the detected first voltage-to-earth signal; and
a third restoring unit configured to restore the first information based on the extracted component of the first frequency.

* * * * *